US012058687B2

(12) United States Patent
Taherzadeh Boroujeni et al.

(10) Patent No.: US 12,058,687 B2
(45) Date of Patent: Aug. 6, 2024

(54) ALTERNATIVE COMMUNICATION RESOURCES FOR CONFIGURED GRANTS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Peter Gaal, San Diego, CA (US); Juan Montojo, San Diego, CA (US); Jing Sun, San Diego, CA (US); Iyab Issam Sakhnini, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/318,611

(22) Filed: May 12, 2021

(65) Prior Publication Data
US 2021/0360686 A1    Nov. 18, 2021

Related U.S. Application Data

(60) Provisional application No. 63/052,389, filed on Jul. 15, 2020, provisional application No. 63/024,336, filed on May 13, 2020.

(51) Int. Cl.
*H04W 52/14* (2009.01)
*H04L 1/1812* (2023.01)
(Continued)

(52) U.S. Cl.
CPC ........... *H04W 72/23* (2023.01); *H04L 1/1819* (2013.01); *H04W 72/535* (2023.01)

(58) Field of Classification Search
None
See application file for complete search history.

(56) References Cited

U.S. PATENT DOCUMENTS 11,516,838 B2    11/2022  Taherzadeh Boroujeni
11,540,282 B2 *  12/2022  Wang ................ H04W 72/0453
(Continued)

FOREIGN PATENT DOCUMENTS

EP           3826406 A1    5/2021
WO    WO-2018175420 A1    9/2018
(Continued)

OTHER PUBLICATIONS

International Search Report and Written Opinion—PCT/US2021/032181—ISA/EPO—dated Sep. 21, 2021.
(Continued)

*Primary Examiner* — Sithu Ko
(74) *Attorney, Agent, or Firm* — Holland & Hart LLP/QUALCOMM Incorporated

(57) ABSTRACT

Methods, systems, and devices for wireless communications are described in which one or more semi-persistent scheduling (SPS) configurations may provide periodic resources for communications between a base station and a user equipment (UE). One or more of the SPS configurations may also provide alternative resources that may be used for the communications in the event that a communication on the periodic or dynamically scheduled resources is cancelled. In the event that the base station transmits a cancellation indicator that cancels one or more of the communications, it may be determined whether to use the alternative resources for the associated communication. The determination to sue the alternative resources may be based on a time duration of the cancellation, a frequency portion of the cancelled resources, or combinations thereof.

49 Claims, 21 Drawing Sheets

(51) Int. Cl.
  *H04L 5/00*  (2006.01)
  *H04W 72/23*  (2023.01)
  *H04W 72/50*  (2023.01)

(56) References Cited

U.S. PATENT DOCUMENTS

| | | | |
|---|---|---|---|
| 11,558,873 B2* | 1/2023 | Lin | H04L 1/0003 |
| 2016/0302250 A1 | 10/2016 | Sheng | |
| 2017/0041902 A1 | 2/2017 | Sheng | |
| 2018/0219590 A1* | 8/2018 | Matsuda | H04J 11/0036 |
| 2019/0239112 A1 | 8/2019 | Rao et al. | |
| 2019/0254067 A1* | 8/2019 | Al-Imari | H04W 72/1268 |
| 2020/0008183 A1* | 1/2020 | Chen | H04W 72/20 |
| 2020/0045674 A1 | 2/2020 | Tseng et al. | |
| 2020/0314889 A1* | 10/2020 | Cirik | H04L 5/0098 |
| 2020/0344747 A1* | 10/2020 | Park | H04W 72/1268 |
| 2021/0144708 A1* | 5/2021 | Wang | H04W 72/23 |
| 2021/0168783 A1* | 6/2021 | Islam | H04W 72/042 |
| 2021/0184812 A1* | 6/2021 | MolavianJazi | H04L 1/1896 |
| 2021/0266953 A1* | 8/2021 | Pelletier | H04W 72/569 |
| 2021/0274470 A1 | 9/2021 | Ryu et al. | |
| 2021/0307032 A1 | 9/2021 | Osawa et al. | |
| 2021/0345397 A1* | 11/2021 | Li | H04L 1/1887 |
| 2021/0376985 A1* | 12/2021 | Zhou | H04L 5/0053 |
| 2021/0410177 A1* | 12/2021 | Takeda | H04W 72/044 |
| 2022/0014930 A1* | 1/2022 | Zhou | H04L 5/0046 |
| 2022/0022204 A1* | 1/2022 | Fehrenbach | H04W 72/12 |
| 2022/0210793 A1* | 6/2022 | Behravan | H04W 12/106 |
| 2022/0217736 A1* | 7/2022 | Taherzadeh Boroujeni | H04W 72/0446 |

FOREIGN PATENT DOCUMENTS

| | | |
|---|---|---|
| WO | WO-2020017012 A1 | 1/2020 |
| WO | WO-2020033660 A1 | 2/2020 |
| WO | WO-2020197645 A1 | 10/2020 |

OTHER PUBLICATIONS

VIVO: "UL Inter-UE Tx Prioritization for URLLC", 3GPP Draft, 3GPP TSG RAN WG1 #97, R1-1906150_ UL Inter UE TX Prioritization for URLLC, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 1, 2019 (May 1, 2019), XP051708191, 13 Pages, Retrieved from the Internet: URL: http://www.3gpp.org/ftp/tsg%5Fran/WG1%5FRL1/TSGR1%5F97/Docs/R1%2D1906150%2Ezip [retrieved on May 1, 2019], pp. 1-9, the whole document.

Intel Corporation: "Enhancements to Inter-UE Multiplexing", 3GPP Draft, R1-1912218, 3GPP TSG-RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823295, pp. 1-6, Chapter 2.2 DCI Contents and RUR Configuration, Chapter 2.3 Benefits of UE-Specific DCI Design.

* cited by examiner

ALTERNATIVE COMMUNICATION RESOURCES FOR CONFIGURED GRANTS

CROSS REFERENCE

The present application for patent claims the benefit of U.S. Provisional Patent Application No. 63/024,336 by Taherzadeh Boroujeni et al., entitled "ALTERNATIVE COMMUNICATION RESOURCES FOR CONFIGURED GRANTS," filed May 13, 2020, and to U.S. Provisional Patent Application No. 63/052,389 by Taherzadeh Boroujeni et al., entitled, "TECHNIQUES FOR TRANSMITTING DROPPED SCHEDULED TRANSMISSIONS ON CONFIGURED GRANTS" filed Jul. 15, 2020, assigned to the assignee hereof, and expressly incorporated by reference herein.

INTRODUCTION

The following relates generally to wireless communications and more specifically to management of communication resources for configured grants.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a user equipment (UE) is described. The method may include receiving, from a base station, a cancellation indication that indicates at least a first communication with the base station is cancelled, the first communication using first resources for communications with the base station as part of a first configured grant or as part of a dynamically scheduled grant and communicating with the base station using one or more alternative resources associated with a second configured grant, different from the first resources, based on the received cancellation indication.

An apparatus for wireless communications at a UE is described. The apparatus may include a processor, memory coupled with the processor. The processor and memory configured to receive, from a base station, a cancellation indication that indicates at least a first communication with the base station is cancelled, the first communication using first resources for communications with the base station as part of a first configured grant or as part of a dynamically scheduled grant and communicate with the base station using one or more alternative resources associated with a second configured grant, different from the first resources, based on the received cancellation indication.

Another apparatus for wireless communications at a UE is described. The apparatus may include means for receiving, from a base station, a cancellation indication that indicates at least a first communication with the base station is cancelled, the first communication using first resources for communications with the base station as part of a first configured grant or as part of a dynamically scheduled grant and means for communicating with the base station using one or more alternative resources associated with a second configured grant, different from the first resources, based on the received cancellation indication.

A non-transitory computer-readable medium storing code for wireless communications at a UE is described. The code may include instructions executable by a processor to receive, from a base station, a cancellation indication that indicates at least a first communication with the base station is cancelled, the first communication using first resources for communications with the base station as part of a first configured grant or as part of a dynamically scheduled grant and communicate with the base station using one or more alternative resources associated with a second configured grant, different from the first resources, based on the received cancellation indication. In some examples of the method, apparatuses, and non-transitory computer-readable medium described herein, the first configured grant is one of a set of multiple configured grants that are received from the base station, and the one or more alternative resources are associated with the second configured grant of the set of multiple configured grants that are different than the first configured grant.

In some examples of the method, apparatuses, and non-transitory computer-readable medium described herein, the second configured grant may be identified based on a radio resource control (RRC) configuration of a search space that is associated with a downlink control information (DCI) communication that carries the cancellation indication. In some examples of the method, apparatuses, and non-transitory computer-readable medium described herein, the second configured grant may be selected based on an ordered list of the set of multiple configured grants.

Some examples of the method, apparatuses, and non-transitory computer-readable medium described herein may further include operations, features, means, or instructions for determining, based on the received cancellation indication, whether to transmit the first communication via the one or more alternative resources. Some examples of the method, apparatuses, and non-transitory computer-readable medium described herein may further include operations, features, means, or instructions for receiving, from the base station, configuration information for at least the second configured grant, and one or more criteria for determining whether to use the one or more alternative resources associated with the second configured grant. In some examples of the method, apparatuses, and non-transitory computer-readable medium described herein, the one or more criteria for determining whether to use the one or more alternative resources when the first communication is part of the first configured grant include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

In some examples of the method, apparatuses, and non-transitory computer-readable medium described herein, the one or more criteria for determining whether to use the one or more alternative resources when the first communication is part of the dynamically scheduled grant include one or more of a hybrid automatic repeat request (HARD) identifier associated with the first communication, a repetition number of the first communication, or an indication of whether a transport block size follows the first communication, or any combinations thereof.

In some examples of the method, apparatuses, and non-transitory computer-readable medium described herein, the one or more alternative resources may be indicated as one or more alternative resource parameters in the first configured grant that provides the first resources for the first communication when the first communication is part of the first configured grant. In some examples of the method, apparatuses, and non-transitory computer-readable medium described herein, the one or more alternative resource parameters include one or more of secondary time resources, secondary frequency resources, a secondary beam, or any combinations thereof, that are to be used in response to the cancellation indication.

Some examples of the method, apparatuses, and non-transitory computer-readable medium described herein may further include operations, features, means, or instructions for determining to use the one or more alternative resources for transmission of the first communication based on a length of a cancellation duration provided with the cancellation indication. Some examples of the method, apparatuses, and non-transitory computer-readable medium described herein may further include operations, features, means, or instructions for determining a time duration for using the one or more alternative resources based on a timing of the cancellation indication relative to at least the first communication, the length of the cancellation duration, a configured time duration, or any combinations thereof. In some examples of the method, apparatuses, and non-transitory computer-readable medium described herein, the one or more alternative resources may be used to transmit the first communication when the length of the cancellation duration meets or exceeds a time threshold, and the UE cancels the first communication when the length of the cancellation duration is less than the time threshold.

In some examples of the method, apparatuses, and non-transitory computer-readable medium described herein, the one or more alternative resources may be determined based on a frequency portion identifier provided in the cancellation indication. In some examples of the method, apparatuses, and non-transitory computer-readable medium described herein, the frequency portion identifier indicates whether frequency resources spanning all or a portion of a bandwidth part (BWP) may be cancelled.

A method for wireless communications at a base station is described. The method may include transmitting, to a UE, one or more of a first configured grant that provides first resources for communications with the UE or a dynamically scheduled grant that provides the first resources for communications with the UE, transmitting a cancellation indication to the UE that indicates at least a first communication using the first resources is cancelled, and communicating with the UE using one or more alternative resources associated with a second configured grant, different from the first resources, based on the cancellation indication.

An apparatus for wireless communications at a base station is described. The apparatus may include a processor, memory coupled with the processor. The processor and memory configured to transmit, to a UE, one or more of a first configured grant that provides first resources for communications with the UE or a dynamically scheduled grant that provides the first resources for communications with the UE, transmit a cancellation indication to the UE that indicates at least a first communication using the first resources is cancelled, and communicate with the UE using one or more alternative resources associated with a second configured grant, different from the first resources, based on the cancellation indication.

Another apparatus for wireless communications at a base station is described. The apparatus may include means for transmitting, to a UE, one or more of a first configured grant that provides first resources for communications with the UE or a dynamically scheduled grant that provides the first resources for communications with the UE, means for transmitting a cancellation indication to the UE that indicates at least a first communication using the first resources is cancelled, and means for communicating with the UE using one or more alternative resources associated with a second configured grant, different from the first resources, based on the cancellation indication.

A non-transitory computer-readable medium storing code for wireless communications at a base station is described. The code may include instructions executable by a processor to transmit, to a UE, one or more of a first configured grant that provides first resources for communications with the UE or a dynamically scheduled grant that provides the first resources for communications with the UE, transmit a cancellation indication to the UE that indicates at least a first communication using the first resources is cancelled, and communicate with the UE using one or more alternative resources associated with a second configured grant, different from the first resources, based on the cancellation indication.

In some examples of the method, apparatuses, and non-transitory computer-readable medium described herein, the second configured grant may be identified based on an RRC configuration of a search space that is associated with a DCI communication that carries the cancellation indication. In some examples of the method, apparatuses, and non-transitory computer-readable medium described herein, the second configured grant may be selected based on an ordered list of a set of multiple configured grants. Some examples of the method, apparatuses, and non-transitory computer-readable medium described herein may further include operations, features, means, or instructions for determining, based on the cancellation indication, whether to monitor for the first communication from the UE via the one or more alternative resources.

In some examples of the method, apparatuses, and non-transitory computer-readable medium described herein, the transmitting may include operations, features, means, or instructions for transmitting, to the UE, configuration information for the first configured grant and the one or more alternative resources, and one or more criteria for determining whether to use the one or more alternative resources in response to a cancellation indication and where the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

In some examples of the method, apparatuses, and non-transitory computer-readable medium described herein, the one or more criteria for determining whether to use the one or more alternative resources when the first communication is part of the dynamically scheduled grant include one or more of a hybrid automatic repeat request (HARD) identifier associated with the first communication, a repetition number of the first communication, or an indication of whether a transport block size follows the first communication, or any combinations thereof.

In some examples of the method, apparatuses, and non-transitory computer-readable medium described herein, the one or more alternative resources may be configured as one or more alternative resource parameters in the second configured grant, and the one or more alternative resource parameters include one or more of secondary time resources, secondary frequency resources, a secondary beam, or any combinations thereof, that are to be used in response to the cancellation indication.

In some examples of the method, apparatuses, and non-transitory computer-readable medium described herein, the determining may include operations, features, means, or instructions for determining to use the one or more alternative resources for the first communication based on a length of a cancellation duration provided with the cancellation indication. In some examples of the method, apparatuses, and non-transitory computer-readable medium described herein, the one or more alternative resources may be determined based on a frequency portion identifier provided in the cancellation indication.

A method for wireless communication is described. The method may include communicating a configuration with one or more parameters for transmitting, on a configured grant, a corresponding data channel repetition corresponding to a dropped dynamically scheduled data channel repetition, determining to drop the dropped dynamically scheduled data channel repetition, and transmitting, based on determining to drop the dropped dynamically scheduled data channel repetition, the corresponding data channel repetition over resources of the configured grant and based on the one or more parameters.

An apparatus for wireless communication is described. The apparatus may include a processor, memory coupled with the processor, and instructions stored in the memory. The instructions may be executable by the processor to cause the apparatus to communicate a configuration with one or more parameters for transmitting, on a configured grant, a corresponding data channel repetition corresponding to a dropped dynamically scheduled data channel repetition, determine to drop the dropped dynamically scheduled data channel repetition, and transmit, based on determining to drop the dropped dynamically scheduled data channel repetition, the corresponding data channel repetition over resources of the configured grant and based on the one or more parameters.

Another apparatus for wireless communication is described. The apparatus may include means for communicating a configuration with one or more parameters for transmitting, on a configured grant, a corresponding data channel repetition corresponding to a dropped dynamically scheduled data channel repetition, means for determining to drop the dropped dynamically scheduled data channel repetition, and means for transmitting, based on determining to drop the dropped dynamically scheduled data channel repetition, the corresponding data channel repetition over resources of the configured grant and based on the one or more parameters.

A non-transitory computer-readable medium storing code for wireless communication is described. The code may include instructions executable by a processor to communicate a configuration with one or more parameters for transmitting, on a configured grant, a corresponding data channel repetition corresponding to a dropped dynamically scheduled data channel repetition, determine to drop the dropped dynamically scheduled data channel repetition, and transmit, based on determining to drop the dropped dynamically scheduled data channel repetition, the corresponding data channel repetition over resources of the configured grant and based on the one or more parameters.

In some examples of the method, apparatuses, and non-transitory computer-readable medium described herein, the one or more parameters include at least one of a hybrid automatic repeat/request (HARQ) identifier, a repetition number, or an indication of whether a transport block size follows the dropped dynamically scheduled data channel repetition. In some examples of the method, apparatuses, and non-transitory computer-readable medium described herein the communicating the configuration includes receiving the configuration as part of a radio resource control (RRC) configuration for the configured grant. In some examples of the method, apparatuses, and non-transitory computer-readable medium described herein, the one or more parameters include a HARQ offset to be added to a most recently used HARQ identifier for identifying the corresponding data channel repetition. In some examples of the method, apparatuses, and non-transitory computer-readable medium described herein the communicating the configuration includes receiving the configuration in a scheduling downlink control information (DCI).

In some examples of the method, apparatuses, and non-transitory computer-readable medium described herein, at least one of a scheduling DCI for the dynamic grant or an RRC configuration for the configured grant includes one or more parameters indicating a relationship between the corresponding data channel repetition and the dropped dynamically scheduled data channel repetition. Some examples of the method, apparatuses, and non-transitory computer-readable medium described herein may further include operations, features, means, or instructions for communicating the configuration by transmitting uplink control information (UCI) for the configured grant, and the UCI includes an indication of a HARQ identifier of the corresponding data channel repetition.

In some examples of the method, apparatuses, and non-transitory computer-readable medium described herein, the one or more parameters include a new data indicator (NDI) received in a scheduling DCI for the dropped dynamically scheduled data channel repetition, and further including determining, based on the NDI, an indication of whether a transport block size for the corresponding data channel repetition follows the dropped dynamically scheduled data channel repetition. In some examples of the method, apparatuses, and non-transitory computer-readable medium described herein, the one or more parameters include a flag received in a scheduling DCI for the dropped dynamically scheduled data channel repetition indicating whether at least one of a transport block size or a number of resource blocks used for the corresponding data channel repetition should follow parameters indicated in a dynamic grant for the configured grant or parameters in an RRC configuration for the configured grant.

Some examples of the method, apparatuses, and non-transitory computer-readable medium described herein may further include operations, features, means, or instructions for transmitting the corresponding data channel repetition by transmitting one or more repetitions of the corresponding data channel repetition on the resources of the configured grant based on a repetition parameter indicated in an RRC configuration for the configured grant. Some examples of the method, apparatuses, and non-transitory computer-readable medium described herein may further include operations, features, means, or instructions for transmitting the corresponding data channel repetition by transmitting a number of repetitions of the corresponding data channel repetition that is less than or equal to a value of the repetition parameter. Some examples of the method, apparatuses, and non-transitory computer-readable medium described herein may further include operations, features, means, or instructions for transmitting one or more repetitions of the corresponding data channel repetition on the resources of the configured grant regardless of a repetition parameter indicated in an RRC configuration for the configured grant. In some examples of the method, apparatuses, and non-transitory computer-readable medium described herein the communicating the configuration or transmitting the corresponding data channel repetition over the resources of the configured grant is based on a frequency range configured for the dropped dynamically scheduled data channel repetition.

A method for wireless communication is described. The method may include communicating a configuration with one or more parameters for transmitting, on a configured grant, a corresponding data channel repetition corresponding to a dropped dynamically scheduled data channel repetition that is dropped and receiving the corresponding data channel repetition over resources of the configured grant and based on the one or more parameters.

An apparatus for wireless communication is described. The apparatus may include a processor, memory coupled with the processor, and instructions stored in the memory. The instructions may be executable by the processor to cause the apparatus to communicate a configuration with one or more parameters for transmitting, on a configured grant, a corresponding data channel repetition corresponding to a dropped dynamically scheduled data channel repetition that is dropped and receive the corresponding data channel repetition over resources of the configured grant and based on the one or more parameters.

Another apparatus for wireless communication is described. The apparatus may include means for communicating a configuration with one or more parameters for transmitting, on a configured grant, a corresponding data channel repetition corresponding to a dropped dynamically scheduled data channel repetition that is dropped and means for receiving the corresponding data channel repetition over resources of the configured grant and based on the one or more parameters.

A non-transitory computer-readable medium storing code for wireless communication is described. The code may include instructions executable by a processor to communicate a configuration with one or more parameters for transmitting, on a configured grant, a corresponding data channel repetition corresponding to a dropped dynamically scheduled data channel repetition that is dropped and receive the corresponding data channel repetition over resources of the configured grant and based on the one or more parameters.

In some examples of the method, apparatuses, and non-transitory computer-readable medium described herein, the one or more parameters include at least one of a HARQ identifier, a repetition number, or an indication of whether a transport block size follows the dropped dynamically scheduled data channel repetition, for the data channel repetition. In some examples of the method, apparatuses, and non-transitory computer-readable medium described herein the communicating the configuration includes transmitting the configuration as part of an RRC configuration for the configured grant. In some examples of the method, apparatuses, and non-transitory computer-readable medium described herein, the one or more parameters include a HARQ offset to be added to a most recently used HARQ identifier for identifying the corresponding data channel repetition.

In some examples of the method, apparatuses, and non-transitory computer-readable medium described herein the communicating the configuration includes transmitting the configuration in a scheduling DCI. In some examples of the method, apparatuses, and non-transitory computer-readable medium described herein, at least one of a scheduling DCI for the dynamic grant or an RRC configuration for the configured grant includes one or more parameters indicating a relationship between the corresponding data channel repetition and the dropped dynamically scheduled data channel repetition that is dropped. In some examples of the method, apparatuses, and non-transitory computer-readable medium described herein the communicating the configuration includes receiving UCI for the configured grant, and the UCI includes an indication of a HARQ identifier of the corresponding data channel repetition.

In some examples of the method, apparatuses, and non-transitory computer-readable medium described herein, the one or more parameters include a NDI received in a scheduling DCI for the dropped dynamically scheduled data channel repetition. In some examples of the method, apparatuses, and non-transitory computer-readable medium described herein, the one or more parameters include a flag received in a scheduling DCI for the dropped dynamically scheduled data channel repetition indicating whether at least one of a transport block size or a number of resource blocks used for the corresponding data channel repetition should follow parameters indicated in a dynamic grant for the configured grant or parameters in an RRC configuration for the configured grant. In some examples of the method, apparatuses, and non-transitory computer-readable medium described herein the receiving the corresponding data channel repetition includes receiving one or more repetitions of the corresponding data channel repetition on the resources of the configured grant based on a repetition parameter indicated in an RRC configuration for the configured grant.

Some examples of the method, apparatuses, and non-transitory computer-readable medium described herein may further include operations, features, means, or instructions for receiving the corresponding data channel repetition by receiving a number of repetitions of the corresponding data channel repetition that is less than or equal to a value of the repetition parameter. In some examples of the method, apparatuses, and non-transitory computer-readable medium described herein the receiving the corresponding data channel repetition includes receiving one or more repetitions of the corresponding data channel repetition on the resources of the configured grant regardless of a repetition parameter indicated in an RRC configuration for the configured grant. In some examples of the method, apparatuses, and non-transitory computer-readable medium described, the communicating the configuration or receiving the corresponding data channel repetition over the resources of the configured grant is based on a frequency range configured for the dropped dynamically scheduled data channel repetition.

A method of wireless communications at a UE is described. The method may include identifying periodic resources for communications with a base station as part of a configured grant, receiving, from the base station, a cancellation indication that indicates at least a first communication with the base station using the periodic resources is cancelled, and identifying one or more alternative resources, different from the identified periodic resources, based on the received cancellation indication.

An apparatus for wireless communications at a UE is described. The apparatus may include a processor and memory coupled with the processor, the processor and memory configured to identify periodic resources for communications with a base station as part of a configured grant, receive, from the base station, a cancellation indication that indicates at least a first communication with the base station using the periodic resources is cancelled, and identify one or more alternative resources, different from the identified periodic resources, based on the received cancellation indication.

Another apparatus for wireless communications at a UE is described. The apparatus may include means for identifying periodic resources for communications with a base station as part of a configured grant, receiving, from the base station, a cancellation indication that indicates at least a first communication with the base station using the periodic resources is cancelled, and identifying one or more alternative resources, different from the identified periodic resources, based on the received cancellation indication.

A non-transitory computer-readable medium storing code for wireless communications at a UE is described. The code may include instructions executable by a processor to identify periodic resources for communications with a base station as part of a configured grant, receive, from the base station, a cancellation indication that indicates at least a first communication with the base station using the periodic resources is cancelled, and identify one or more alternative resources, different from the identified periodic resources, based on the received cancellation indication.

Some examples of the method, apparatuses, and non-transitory computer-readable medium described herein may further include operations, features, means, or instructions for determining, based on the received cancellation indication, whether to transmit the first communication via the one or more alternative resources. In some examples of the method, apparatuses, and non-transitory computer-readable medium described herein, the identifying further may include operations, features, means, or instructions for receiving, from the base station, configuration information for the configured grant and the one or more alternative resources, and one or more criteria for determining whether to use the one or more alternative resources. In some examples of the method, apparatuses, and non-transitory computer-readable medium described herein, the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

In some examples of the method, apparatuses, and non-transitory computer-readable medium described herein, the configured grant may be a first configured grant of a set of configured grants that is received from the base station, and where the one or more alternative resources are associated with a second configured grant of the set of configured grants that is different than the first configured grant. In some examples of the method, apparatuses, and non-transitory computer-readable medium described herein, the second configured grant may be identified based on a RRC configuration of a search space that is associated with a DCI communication that carries the cancellation indication. In some examples of the method, apparatuses, and non-transitory computer-readable medium described herein, the second configured grant may be selected based on an ordered list of the set of configured grants.

In some examples of the method, apparatuses, and non-transitory computer-readable medium described herein, the one or more alternative resources may be indicated as one or more alternative resource parameters in the configured grant that provides the periodic resources for the first communication. In some examples of the method, apparatuses, and non-transitory computer-readable medium described herein, the one or more alternative resource parameters include one or more of secondary time resources, secondary frequency resources, a secondary beam, or any combinations thereof, that are to be used in response to the cancellation indication.

Some examples of the method, apparatuses, and non-transitory computer-readable medium described herein may further include operations, features, means, or instructions for determining to use the one or more alternative resources for transmission of the first communication based on a length of a cancellation duration provided with the cancellation indication. Some examples of the method, apparatuses, and non-transitory computer-readable medium described herein may further include operations, features, means, or instructions for determining a time duration for using the alternative resources based on a timing of the cancellation indication relative to at least the first communication, the length of the cancellation duration, a configured time duration, or any combinations thereof.

In some examples of the method, apparatuses, and non-transitory computer-readable medium described herein, the one or more alternative resources may be used to transmit the first communication when the length of the cancellation duration meets or exceeds a time threshold, and where the UE cancels the first communication when the length of the cancellation duration is less than the time threshold. In some examples of the method, apparatuses, and non-transitory computer-readable medium described herein, the alternative resources may be determined based on a frequency portion identifier provided in the cancellation indication. In some examples of the method, apparatuses, and non-transitory computer-readable medium described herein, the frequency portion identifier indicates whether frequency resources spanning all or a portion of a bandwidth part (BWP) are cancelled.

A method of wireless communications at a base station is described. The method may include configuring a UE with a configured grant that provides periodic resources for communications with the UE, determining to cancel at least a first communication with the UE using the periodic resources, transmitting a cancellation indication to the UE that indicates at least the first communication using the periodic resources is cancelled, and identifying one or more alternative resources, different from the identified periodic resources, based on the cancellation indication.

An apparatus for wireless communications at a base station is described. The apparatus may include a processor and memory coupled with the processor, the processor and memory configured to configure a UE with a configured grant that provides periodic resources for communications with the UE, determine to cancel at least a first communication with the UE using the periodic resources, transmit a cancellation indication to the UE that indicates at least the first communication using the periodic resources is cancelled, and identify one or more alternative resources, different from the identified periodic resources, based on the cancellation indication.

Another apparatus for wireless communications at a base station is described. The apparatus may include means for configuring a UE with a configured grant that provides periodic resources for communications with the UE, determining to cancel at least a first communication with the UE using the periodic resources, transmitting a cancellation indication to the UE that indicates at least the first communication using the periodic resources is cancelled, and identifying one or more alternative resources, different from the identified periodic resources, based on the cancellation indication.

A non-transitory computer-readable medium storing code for wireless communications at a base station is described. The code may include instructions executable by a processor to configure a UE with a configured grant that provides periodic resources for communications with the UE, determine to cancel at least a first communication with the UE using the periodic resources, transmit a cancellation indication to the UE that indicates at least the first communication using the periodic resources is cancelled, and identify one or more alternative resources, different from the identified periodic resources, based on the cancellation indication.

Some examples of the method, apparatuses, and non-transitory computer-readable medium described herein may further include operations, features, means, or instructions for determining, based on the cancellation indication, whether to monitor for the first communication from the UE via the one or more alternative resources. In some examples of the method, apparatuses, and non-transitory computer-readable medium described herein, the configuring further may include operations, features, means, or instructions for transmitting, to the UE, configuration information for the configured grant and the one or more alternative resources, and one or more criteria for determining whether to use the one or more alternative resources in response to a cancellation indication. In some examples of the method, apparatuses, and non-transitory computer-readable medium described herein, the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

In some examples of the method, apparatuses, and non-transitory computer-readable medium described herein, the configured grant may be a first configured grant of a set of configured grants that are configured at the UE, and where the one or more alternative resources are associated with a second configured grant of the set of configured grants that is different than the first configured grant. In some examples of the method, apparatuses, and non-transitory computer-readable medium described herein, the second configured grant may be identified based on a RRC configuration of a search space that is associated with a DCI communication that carries the cancellation indication. In some examples of the method, apparatuses, and non-transitory computer-readable medium described herein, the second configured grant may be selected based on an ordered list of the set of configured grants.

In some examples of the method, apparatuses, and non-transitory computer-readable medium described herein, the one or more alternative resources may be configured as one or more alternative resource parameters in the configured grant that provides the periodic resources for the first communication. In some examples of the method, apparatuses, and non-transitory computer-readable medium described herein, the one or more alternative resource parameters include one or more of secondary time resources, secondary frequency resources, a secondary beam, or any combinations thereof, that are to be used in response to the cancellation indication.

In some examples of the method, apparatuses, and non-transitory computer-readable medium described herein, the determining further may include operations, features, means, or instructions for determining to use the one or more alternative resources for the first communication based on a length of a cancellation duration provided with the cancellation indication. Some examples of the method, apparatuses, and non-transitory computer-readable medium described herein may further include operations, features, means, or instructions for determining a time duration for using the alternative resources based on a timing of the cancellation indication relative to at least the first communication, the length of the cancellation duration, a configured time duration, or any combinations thereof. In some examples of the method, apparatuses, and non-transitory computer-readable medium described herein, the one or more alternative resources are used for the first communication when the length of the cancellation duration meets or exceeds a time threshold, and where the UE cancels the first communication when the length of the cancellation duration is less than the time threshold. In some examples of the method, apparatuses, and non-transitory computer-readable medium described herein, the alternative resources may be determined based on a frequency portion identifier provided in the cancellation indication. In some examples of the method, apparatuses, and non-transitory computer-readable medium described herein, the frequency portion identifier indicates whether frequency resources spanning all or a portion of a bandwidth part (BWP) is cancelled.

DETAILED DESCRIPTION

Figure 1:
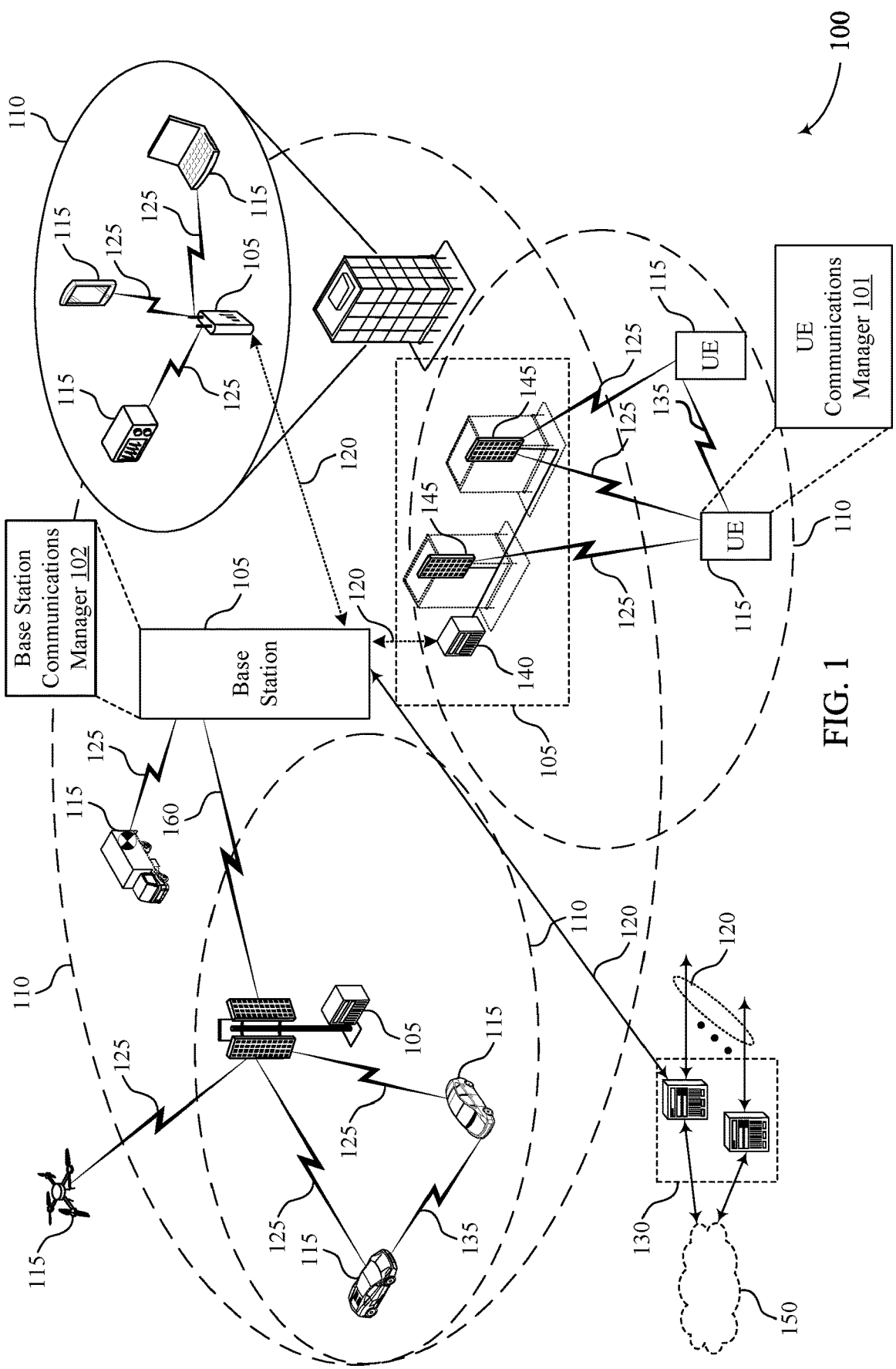
FIG. 1 illustrates an example of a system for wireless communications that supports alternative communication resources for configured grants in accordance with aspects of the present disclosure.

In some wireless communications systems, periodic communications between devices, such as between a base station and a user equipment (UE), may be used to exchange information over a period of time. For example, a device may report information according to a set schedule, which may necessitate communications according to a set periodicity. In some cases, in order to help reduce signaling overhead associated with separately signaling a resource grant for each such periodic transmission (e.g., in separate dynamic grants that provide transmission resources), a semi-persistent scheduling (SPS) configuration may be provided that configures periodic resources for such communications. An SPS configuration may provide a configured grant with periodic resources for uplink transmissions from a UE to a base station, for example. The configured grant can be enabled with a single downlink control information (DCI) transmission (e.g., an activation DCI), and the UE will use the configured resources for uplink transmissions, which can save substantial overhead compared with providing a separate grant for each instance of the periodic transmissions (e.g., particularly if the uplink transmissions contain relatively small amounts of data).

In some cases, such configured resources may include sufficient resources to provide for coverage enhancement such as through multiple repetitions of an uplink communication. In cases where higher priority data is identified by a base station, a configured grant may be canceled by the base station by transmitting a cancellation indication (CI) to the UE, which causes the UE to refrain from the communication using one or more of the configured resources and allows for use of the resource(s) for the higher priority communication (e.g., a ultra-reliable low latency communication (URLLC) with the UE or with a different UE). In some cases, a UE that receives a cancellation may have to wait for another instance of uplink resources of the configured grant to transmit the communication, which can increase latency. Further, cancellations of one or more repetitions of an uplink communication that uses coverage enhancement techniques may impact the link budget and reduce the likelihood of successful reception of the uplink communication at the base station. Thus, such cancellations may waste resources, increase latency, or both.

In some cases, a UE may be configured with alternative resources in addition to the configured resources for uplink communications, where the alternative resources may be used for the uplink communications in the event of a cancellation. In the event of a CI, the UE may transmit the cancelled communication using the alternative resources, and thus latency may be reduced relative to cases where separate grants would be provided for the cancelled communication. Thus, techniques as discussed herein may reduce latency, overhead, or both. The alternative resources may be configured as separate configured grants that are triggered based on a CI, may be configured as alternate resources with a particular configured grant that are used in the event of a CI, or combinations thereof. In some cases, information in the CI, such as a time duration of cancellation or frequency resources that are canceled (e.g., half of a configured bandwidth part (BWP) or the whole BWP, which may impact a set of resource blocks (RBs) associated with the CI), may be used to determine whether the UE is to use the alternate resources, which alternate resources of two or more available alternate resources to use, or combinations thereof. Such alternative resources may be provided in advance of a CI, which can allow use of the alternate resources without a base station having to provide a separate dynamic grant, or a new dynamic grant associated with the CI. Such techniques may thus provide for efficient identification of the alternative resources with relatively low overhead.

Techniques such as discussed herein thus provide for configuration of one or more alternative resources that may be available for a communication in the event of a cancellation of a configured resource that was to be used for the communication. In cases where such alternative resources are provided, a CI may trigger the use of the alternative resources without requiring additional signaling associated with the communication. Thus, the base station can dynamically signal alternative resources for the configured grant without added overhead at the time of the CI and uplink transmission. Such techniques may help reduce latency, enhance reliability, and reduce overhead in a wireless communications system.

Additionally or alternatively, a UE may be configured with uplink resources via a dynamically scheduled grant (e.g., in a DCI) received from a base station over downlink control channel or data channel resources (e.g., over physical downlink control channel (PDCCH) or physical downlink shared channel (PDSCH)), and the UE can be configured for physical uplink shared channel (PUSCH) repetition via the dynamically scheduled grant. In the event that a PUSCH repetition associated with the dynamically scheduled grant is dropped (e.g., due to collision with downlink resources, receiving a CI for the dynamically scheduled grant, etc.), the UE may use configured resources of to transmit the PUSCH repetitions. In an example, additional information about possible retransmission of such a dropped PUSCH (e.g., PUSCH with dynamically scheduled grant) on configured resources may be communicated to the UE. This additional information may include various parameters for transmitting the dropped repetition, which the UE can use to transmit the dropped repetition over the configured resources. Allowing the otherwise dropped repetition to be transmitted in this regard can improve coverage or reliability otherwise lost due to dropping PUSCH repetitions.

Aspects of the disclosure are initially described in the context of wireless communications systems. Examples of configured resources and alternative resources, and a process flow associated with use of alternative resources, are then discussed. Aspects of the disclosure are further illustrated by and described with reference to apparatus diagrams, system diagrams, and flowcharts that relate to alternative communication resources for configured grants.

FIG. 1 illustrates an example of a wireless communications system 100 that supports alternative communication resources for configured grants in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, repeater devices, customer premises equipment (CPE), integrated access and backhaul (IAB) nodes, router devices, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. In some examples, the one or more base stations 105 may provide backhaul connectivity between another base station 105 and core network 130 via a backhaul link 160 while acting as an IAB node.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays, routers, or CPE, as well as the base stations 105 and the network equipment including macro eNBs or gNBs, small cell eNBs or gNBs, IAB nodes, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 MegaHertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-s-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

UEs 115 in some aspects of the present disclosure may be configured with one or more SPS configurations for periodic communications with a base station 105. A UE communications manager 101 may receive the SPS configuration(s) and identify associated sets of configured resources for communications with the base station 105. In some cases, the UE communications manager 101 may receive an activation DCI that enables an SPS configuration, and initiate an SPS configuration to transmit a series of uplink communications using configured resources. In some cases, the UE communications manager 101 may detect a cancellation indicator (CI) from the base station 105, which cancels one or more of the uplink communications using the configured resources. Based on the CI, the UE communications manager 101 may identify alternative resources for an uplink communication with the base station, and may determine whether to use the alternative resources for the uplink communications that was to have been communicated using the canceled resources. The UE communications manager 101 may be an example of a communications manager 910 of FIG. 9.

One or more of the base stations 105 may include a base station communications manager 102. The base station communications manager 102 may transmit one or more SPS configurations to a UE 115, that provide associated sets of configured resources for communications with the base station 105. In some cases, the base station communications manager 102 may transmit an activation DCI that enables an SPS configuration, and initiate an SPS configuration to receive a series of uplink communications using configured resources. In some cases, the base station communications manager 102 may determine to cancel one or more of the configured resources (e.g., in order to use the corresponding resources for a higher priority communication) and transmit a CI to the UE 115, which cancels one or more of the uplink communications using the configured resources. Based on the CI, the base station communications manager 102 may identify alternative resources for an uplink communication from the UE 115, and may determine whether to monitor the alternative resources for the uplink communications that was to have been communicated using the canceled resources. The base station communications manager 102 may be an example of a communications manager 1310 of FIG. 13.

Additionally or alternatively, base station communications manager 102 may can provide information to one or more UEs 115 for using configured resources of a configured grant for transmitting dropped dynamically scheduled data channel repetitions. The UE communications manager 101 can receive the information and/or can determine to drop a dynamically scheduled data channel repetition and transmit the dropped data channel repetition over configured resources, and the base station communication manager 102 may receive the data channel repetition over the configured resources, which can improve data channel coverage, throughput, etc., as described.

Figure 2:
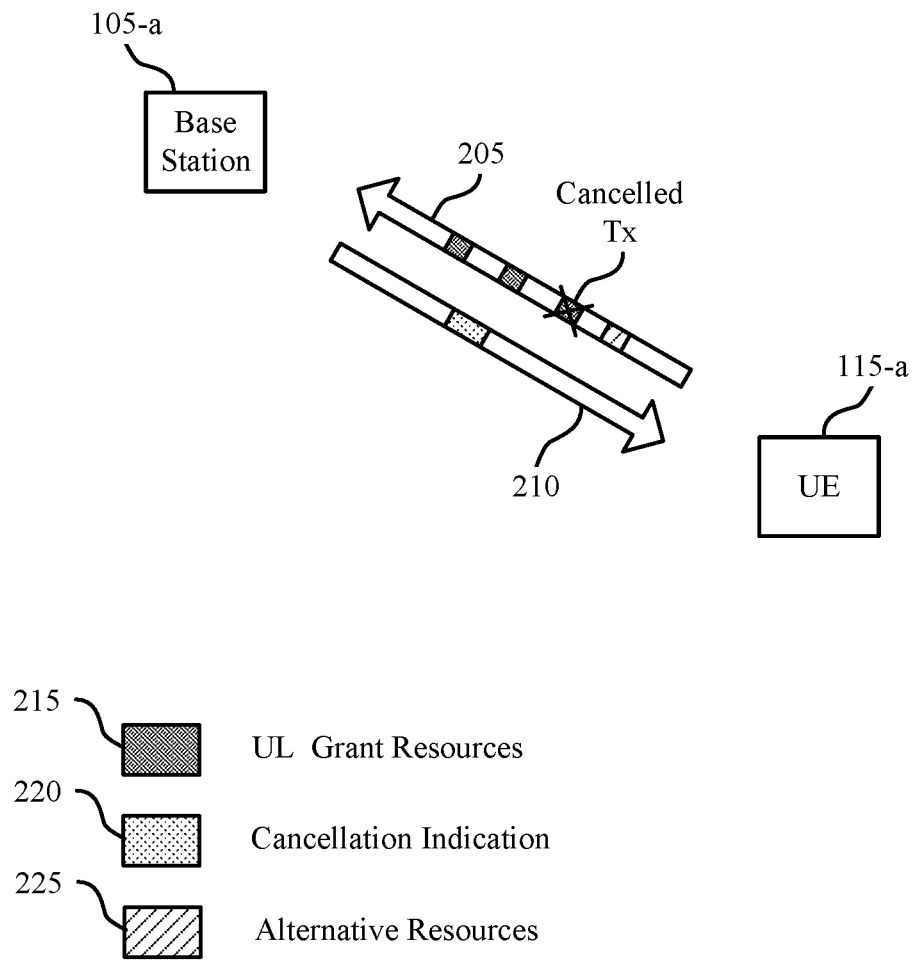
FIG. 2 illustrates an example of a portion of a wireless communications system that supports alternative communication resources for configured grants in accordance with aspects of the present disclosure.

FIG. 2 illustrates an example of a wireless communications system 200 that supports alternative communication resources for configured grants in accordance with aspects of the present disclosure. In some examples, wireless communications system 200 may implement aspects of wireless communications system 100. The wireless communications system 200 may include a base station 105 and a UE 115-*a*, which may be examples of base stations 105 and UEs 115, respectively, as described with reference to FIG. 1. The UE 115-*a* and base station 105-*a* may communicate using communication links (e.g., a Uu link) in which the UE 115-*a* transmits uplink communications 205 to the base station 105-*a*, and the base station 105-*a* transmits downlink communications 210 to the UE 115-*a*.

In some cases, the base station 105-*a* may configure the UE 115-*a* with one or more SPS configurations. The SPS configuration(s) in some cases may provide uplink grant resources 215 which may provide uplink resources (e.g., PUSCH resources) for periodic uplink communications from the UE 115-*a* to the base station 105-*a* according to the SPS configuration. In other cases, the UE 115-*a* may receive a dynamic grant and the uplink grant resources 215 may include resources for multiple repetitions for an uplink communication (e.g., multiple PUSCH repetitions). As discussed herein, in some cases the base station 105-*a* may determine that a higher priority communication (e.g., a URLLC transmission) is present, and may preempt or cancel one or more communications of an SPS configuration. For example, the base station 105-*a* may transmit a preemption indication or cancellation indication 220 that may indicate one or more downlink communications will not be transmitted.

In the example of FIG. 2, cancellation indication 220 may cancel one of the uplink communications using uplink grant resources 215. In response to the cancellation indication 220, the UE 115-*a* may identify alternative resources 225, and in some cases may use the alternative resources 225 for transmission of the uplink communication that was otherwise to have been transmitted using the canceled uplink grant resources 215. Thus, the cancellation indication 220 implicitly informs the UE 115-*a* to use alternative resources for the uplink transmission. While a single UE 115-*a* is illustrated in FIG. 2, in some cases the cancellation indication 220 may be transmitted to a group of UEs 115, and each UE of the group may identify associated alternative resources.

In some cases, the base station 105-*a* may provide multiple configured grants, and the cancellation indication 220 may activate another configured grant. For example, the new configured grant (i.e., that is activated by the cancellation indication 220) may be indicated in a RRC configuration of the search space associated to a group common DCI (GC-DCI) that carries the cancellation indication 220. In some cases, the new configured grant may be selected based on its index (i.e., cancellation of a configured grant for a period of time may automatically activate the next configured grant, based on an ordered list of configured grants). In other cases, the cancellation indication 220 may change one or more parameters of a configured grant (e.g., the time resources, frequency resources, beam, or any combinations thereof). For example, the base station 105-*a* may provide a primary set of parameters for uplink grant resources 215 as well as a secondary set of parameters (e.g., secondary time resources, frequency resources, beam, or any combinations thereof) that are activated by the cancellation indication 220.

In some cases, the alternative resources 225 may be used for communications for a validity duration of the alternative configured grant. The validity duration, in some examples, may be based on the timing of cancellation indication 220, the particular time resources that are cancelled, or any combinations thereof. In some cases the base station 105-*a* and UE 115-*a* may determine whether the cancellation indication 220 activates the use of the alternative resources 225 for communications, or whether the communications in the cancelled resources are to be deferred to a later uplink grant resource 215 or dropped. In some cases, use of the alternative resources 225 for communications may be conditioned on the length of cancellation or the amount of time that the cancellation overlaps with the current uplink grant resources 215. In other cases, the alternative resources 225 may only be used for communications if the cancellation duration exceeds a time threshold. Additionally or alternatively, use of the alternative resources 225 for communications may depend on a frequency portion indicated in the cancellation indication 220 (e.g., if the cancellation indication 220 signals that an entire BWP is cancelled or that one-half of the BWP is cancelled). In such cases, use of the alternative resources 225 may thus depend on a set of RBs associated with the cancellation indication 220. In some cases, the frequency portion indicated in the cancellation indication 220 may be used to determine which of two or more different alternative resources 225 are to be used for communications. Various examples of cancelled resources and alternative resources are discussed with reference to FIGS. 3 and 4.

Additionally or alternatively, in some cases base station 105-*a* may configure UE 115-*a* with uplink resources for transmitting a data channel (e.g., PUSCH), which may include a dynamic grant of dynamically scheduled resources indicated via DCI over PDCCH or PDSCH, and/or may include a configured grant (CG) of resources indicated via RRC signaling and/or activated (or scheduled) via a DCI over PDCCH or PDSCH. In addition, the dynamic grant of dynamically scheduled resources may include one or more parameters related to transmitting data channel repetitions to improve coverage. If the time resources assigned for a data channel repetition collide with one or more downlink symbols (e.g., as specified by slot format indicator (SFI) received in a configuration from the base station 105-*a*) or if a cancellation indication (CI) is received for the dynamic grant, the UE 115-*a* may determine to drop the data channel repetition, and can drop the data channel repetition by refraining from transmitting the data channel repetition over the corresponding time resources. In cases where the UE 115-*a* has a configured grant that allows uplink transmission without dynamic grant (e.g., without DCI or with DCI as an activation command for already configured resources) on some configured resources, the UE 115-*a* may use resources of the configured grant for transmitting dropped data channel repetitions.

In some cases, the one or more parameters can relate to additional information about possible retransmission of dropped dynamically scheduled data channel repetition (e.g. PUSCH with dynamic grant) on configured grant. For example, the one or more parameters may include a HARQ process identifier (ID) that identifies a process related to transmission of the data channel repetition (e.g., retransmission of the data channel). The one or more parameters may include a repetition number or index of a count of repetitions. The one or more parameters may include an indication of whether a transport block size (TBS) of the data channel repetition to be transmitted using the configured grant is to follow that of the dynamically scheduled uplink or not.

As described, the UE 115-*a* can receive a dynamic grant (e.g., via DCI) scheduling uplink resources for transmitting dynamically scheduled data channel (e.g., PUSCH), where the dynamic grant may also include or otherwise relate to resources for transmitting data channel repetitions to improve coverage. In an example, however, time resources for transmitting one or more repetitions may correspond to or overlap with a symbol configured for downlink communications in a SFI received from the base station 105-*a*. For example, the SFI may be indicated in RRC signaling and/or may be updated in DCI or other dynamic signaling to the UE 115-*a*, and the SFI may indicate a communication direction, such as uplink, downlink, flexible, etc., for each symbol in the slot and/or for each of multiple slots. The dynamic grant that schedules uplink resources for transmitting dynamically scheduled data channel may indicate parameters for determining when to transmit repetitions, such as a number of repetitions, relative resource offsets (e.g., in time), such as a number of symbols or symbol offsets at which to transmit the repetitions, etc. Thus, it may be possible that the repetition information may indicate resources for repetition that overlap with time resources previously indicated as reserved for downlink communications (e.g., in the SFI). In this case, the UE 115-*a* can determine to drop the repetition and/or subsequent repetitions that may be defined by the repetition information in the dynamic grant. In another example, the base station 105-*a* can send, to the UE 115-*a*, a CI to cancel resources of a dynamic grant. In either case, the UE 115-*a* can determine to drop the data channel repetition (and/or one or more subsequent repetitions) to refrain from transmitting the data channel repetition(s) as scheduled.

In some cases, the configuration may indicate a HARQ ID for the dropped scheduled data channel repetition that is transmitted on the configured resources, where the configuration may be received in a RRC configuration for the configured grant (or a separate RRC configuration) or a scheduling DCI for the dynamic grant. In this example, the UE 115-*a* can determine which configured resources correspond to a given HARQ ID of the dropped data channel repetition based on the indication in the RRC configuration or scheduling DCI. In one example, where the RRC configuration is used to indicate the HARQ ID, a HARQ offset from a last indicated (e.g., most recently used) HARQ ID may be used the UE 115-*a* derive the HARQ ID based on adding the HARQ offset to the last indicated HARQ ID (e.g., indicated in a previous configuration for transmitting data channel repetitions on a configured grant). The UE 115-*a* may accordingly transmit the dropped data channel repetition over the appropriate configured resources, which may be determined based on HARQ ID.

In another example, a DCI for the dynamic grant that includes a new data indicator (NDI) for indicating whether the UE 115-*a* should transmit new data (e.g., not a retransmission of the data channel) or not over the resources of the dynamic grant. In an, example, the NDI may be considered or interpreted as an implicit indication of whether the same transport block (TB) size or the same number of resource blocks (RBs) should be used for the transmission of the dropped data channel repetition on the configured grant. For example, UE 115-*a* may determine a false value for NDI (e.g., an NDI that indicates not to transmit new data) to implicitly indicate to transmit the data channel repetition with the same TBS or number of RBs, etc., and may accordingly transmit the data channel repetition with the same TBS or number of RBs over the configured grant as indicated in the dynamic grant.

In another example, the dynamic grant may include a flag to indicate whether the same TB size or the same number of RBs should be used for the transmission of the dropped data channel repetition on the configured grant, or whether parameters of the configured grant should be used. For example, the RRC configuration for the configured grant can include a TB size or number of RBs that can be used in case the dynamic grant overrides a configured grant occasion. In this example, UE 115-*a* can obtain the flag from the dynamic grant for the data channel repetition and determine whether the TB size or number of RBs should be the same as that indicated for the dropped data channel repetition (e.g., as indicated in the configured grant) or the same as indicated for the RRC configuration of the configured grant based on the flag. The UE 115-*a* can accordingly transmit the data channel repetition over the configured grant resources and based on the determined TB size and/or number of RBs.

In another example, a grant that indicates a relationship (e.g., a HARQ relationship) between data channel repetitions. For example, base station 105-*a* may transmit the grant including the dynamic grant for the dynamically scheduled data channel, where the dynamic grant indicates the relationship between the dynamically scheduled data channel and the dropped data channel repetition that is transmitted over resources of the configured grant. In another example, base station 105-*a* can transmit the grant including a RRC configuration for a configured grant that indicates the relationship between the dynamically scheduled data channel and the dropped data channel repetition that is transmitted over resources for the configured grant. The UE 115-*a* can receive the grant that indicates the relationship (e.g., a HARQ relationship) between data channel repetitions and accordingly transmit the data channel repetition over the appropriate configured grant resources based on the relationship, as described.

In some cases, the RRC configuration for the configured grant can include a repetition parameter for transmitting data channel repetitions in the configured grant (e.g., a RepK parameter). In this example, UE 115-*a* can transmit the data channel repetition according to this parameter or irrespective of the parameter (e.g., following the dynamic grant number of repetitions or remaining repetitions since the dropped repetition). In yet another example, UE 115-*a* can transmit up to the number of repetitions indicated by the repetition parameter in the configured grant (e.g., the number of remaining repetitions up to the number indicated in the configured grant).

Figure 3:
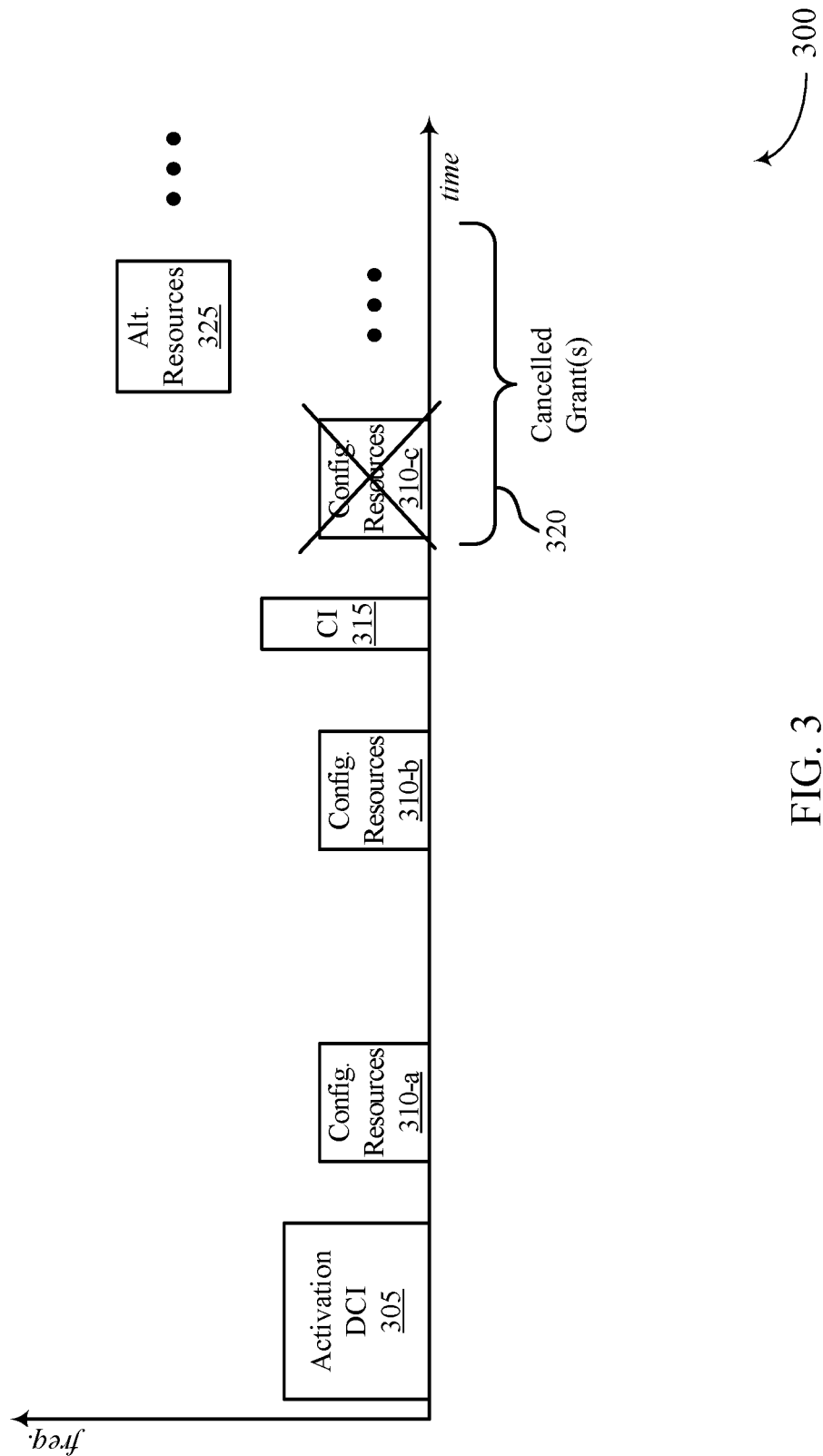
FIGS. 3 and 4 illustrate examples a configured and alternative resources for configured grants in accordance with aspects of the present disclosure.

FIG. 3 illustrates an example of configured and alternative resources 300 for configured grants in accordance with aspects of the present disclosure. In some examples, configured and alternative resources 300 may implement aspects of wireless communications system 100 or 200. In this example, a base station (e.g., a base station 105 of FIG. 1 or 2) may provide one or more configured grants to a UE (e.g., a UE 115 of FIG. 1 or 2).

As illustrated in FIG. 3, an activation DCI 305 may be used to activate a configured grant. The configured grant may have periodic configured resources 310 that may be used by the UE for uplink transmissions to the base station, which include first configured resources 310-*a*, second configured resources 310-*b*, third configured resources 310-*c*, and so on. In this example, a CI 315 is received prior to the third configured resources 310-*c* that cancels one or more associated uplink communications that were to be transmitted using the third configured resources 310-*c* and possibly one or more other configured resources, depending upon a time duration 320 indicated by the CI 315. In this example, alternative resources 325 may be configured, and may be used for uplink communications that otherwise would have been transmitted using the third configured resources 310-*c* (and optionally one or more further configured resources). In this example, the alternative resources 325 occupy different time and frequency resources than the third configured resource 310-*c*, although in other cases the same time resources and different frequency resources may be used, or the same frequency resources and different time resources may be used. In some cases, the alternative resources 325 may be preconfigured as alternative resources as part of the SPS configuration that provides the configured grant, may be preconfigured as a separate configured grant that is activated by the CI 315 (e.g., an ordered list of configured grants may be provided, and an index value for a configured grant that is to be used may be incremented based on the CI 315, or indicated in the CI 315). In some cases, after a cancellation duration that is indicated by the CI 315 expires, the initial configured resources may again be used for communications.

Figure 4:
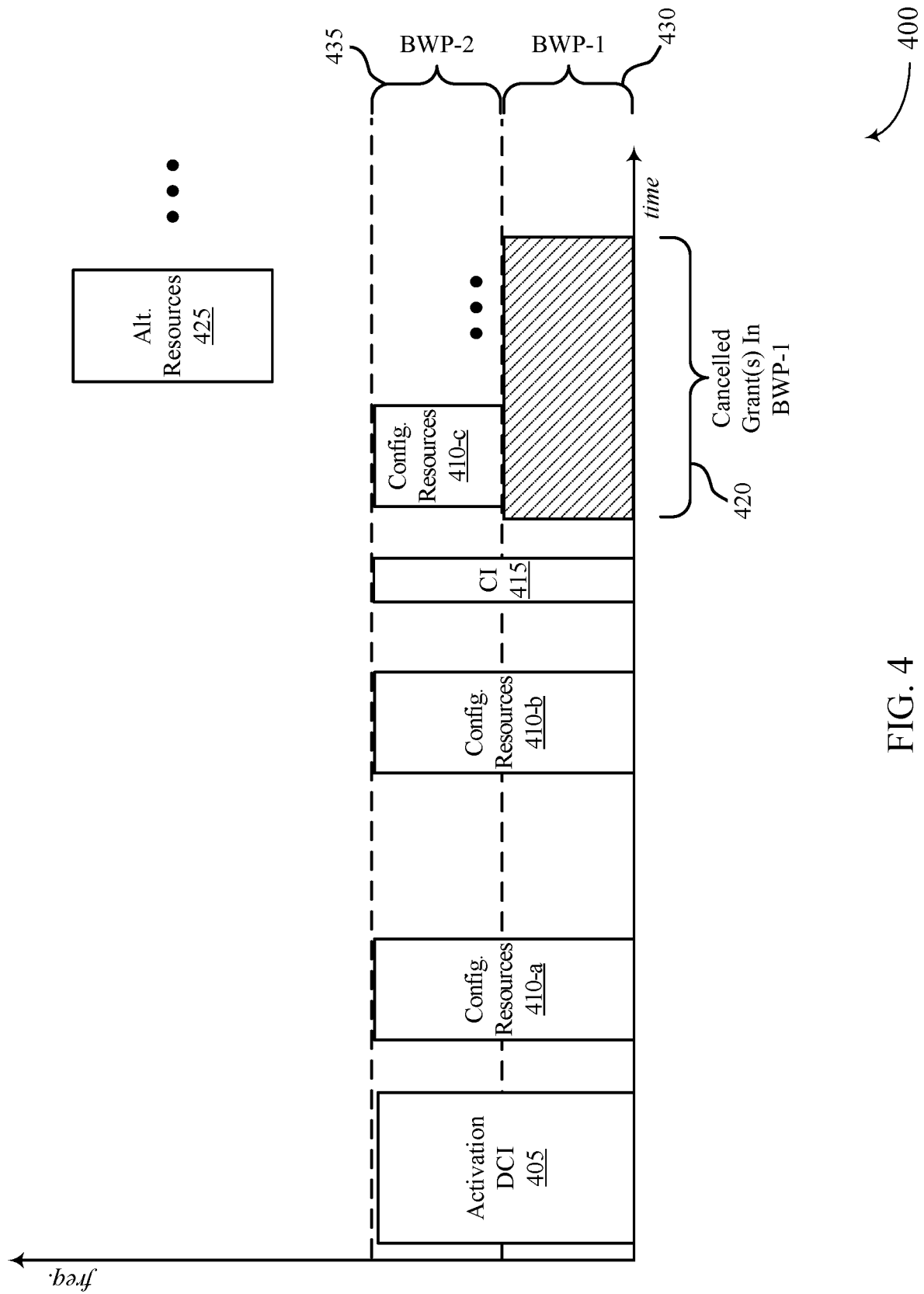

FIG. 4 illustrates an example of a configured and alternative resources 400 for configured grants in accordance with aspects of the present disclosure. In some examples, configured and alternative resources 400 may implement aspects of wireless communications system 100 or 200. In this example, a base station (e.g., a base station 105 of FIG. 1 or 2) may provide one or more configured grants to a UE (e.g., a UE 115 of FIG. 1 or 2).

As illustrated in FIG. 4, an activation DCI 405 may be used to activate a configured grant. The configured grant may have periodic configured resources 410 that may be used by the UE for uplink transmissions to the base station, which include first configured resources 410-*a*, second configured resources 410-*b*, third configured resources 410-*c*, and so on. In this example, a CI 415 is received prior to the third configured resources 410-*c*. In this example, the CI 415 indicates a frequency portion of the configured resources 410 that is cancelled, which in this example is a first BWP 430. Thus, in this example, RBs that overlap with the first BWP 430 are cancelled, and RBs that are within second BWP 435 are not cancelled.

In this example, the CI 415 may thus indicate a frequency portion of cancelled resources, as well as a cancellation duration. In this example, alternative resources 425 may be configured, and may be used for uplink communications that otherwise would have been transmitted using the third configured resources 410-*c* (and optionally one or more further configured resources). In some cases, the UE and base station may determine whether the alternative resources 425 are to be used based on whether an uplink transmission could be transmitted using the second BWP 435 or not. In some cases, the UE may transmit one or more RBs in the second BWP 435, and use the alternative resources 425 for RB(s) that were to be transmitted in the first BWP 430, in which case the frequency resources of the alternative resources 425 may be dependent upon the frequency portion indicated in the CI 415. In some cases, after a cancellation duration that is indicated by the CI 315 expires, the initial configured resources may again be used for communications.

Figure 5:
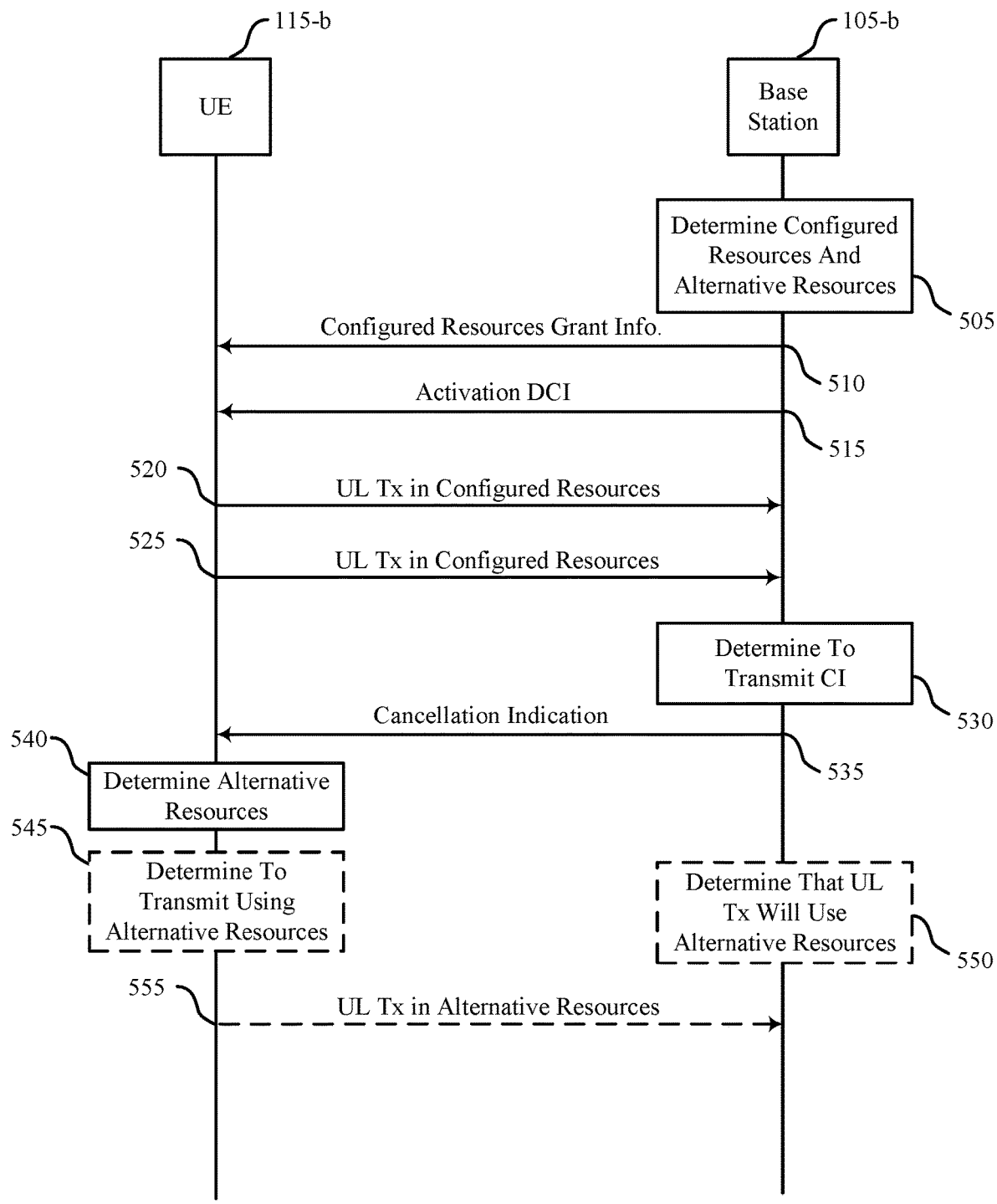
FIG. 5 illustrates an example of a process flow that supports alternative communication resources for configured grants in accordance with aspects of the present disclosure.

FIG. 5 illustrates an example of a process flow 500 that supports alternative communication resources for configured grants in accordance with aspects of the present disclosure. In some examples, process flow 500 may implement aspects of wireless communications system 100 or 200. Process flow 500 may be implemented by a UE 115-*b* and a base station 105-*b* as described herein. In the following description of the process flow 500, the communications between the UE 115-*b* and the base station 105-*b* may be transmitted in a different order than the example order shown, or the operations performed by the UE 115-*b* and base station 105-*b* may be performed in different orders or at different times. Some operations may also be omitted from the process flow 500, and other operations may be added to the process flow 500.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 505, the base station 105-*b* may determine configured resources and alternative resources for one or more SPS configurations at the UE 115-*b* (and optionally one or more other UEs). In some cases, the configured resources and alternative resources may be determined based on a type of communications and a periodicity of the communications (e.g., based on a request from the UE 115-*b* for periodic resources). At 510, the base station 105-*b* may transmit configured resources grant information to the UE 115-*b*. In some cases, the base station 105 may transmit RRC signaling including an indication of a one or more sets of parameters associated with a first SPS configuration and one or more sets of alternative parameters that define the alternative resources. In other cases, the base station 105-*b* may transmit multiple SPS configurations that each have an associated index value, and the index values may be in an ordered list for selection of alternative resources as discussed herein for various examples.

At 515, the base station 105-*b* may transmit an activation DCI to the UE 115-*b* to activate an SPS configuration and begin using configured resources for communications. At 520, responsive to the activation DCI, the UE 115-*b* may transmit an uplink transmission in the configured resources. Likewise, at 525, the UE 115-*b* may transmit another uplink transmission in the configured resources.

In this example, at 530, the base station 105-*b* may determine to transmit a CI to the UE 115-*b*. Such a determination may be based on the base station 105-*b* receiving an indication of higher priority communications that are to be transmitted, for example. At 535, the base station 105-*b* may transmit the CI to the UE 115-*b*. In some cases, the CI may be transmitted in a GC-DCI to a number of different UEs 115, and may function to cancel uplink communications at multiple UEs for a cancellation duration that is indicated in the CI.

At 540, the UE 115-*b* may determine alternative resources for uplink transmissions to the base station 105-*b*. In some cases, the alternative resources may be determined based on information provided in the CI, such as a frequency portion of cancelled resources, a cancellation duration, or combinations thereof. In some cases, at 545, the UE 115-*b* may determine to transmit using the alternative resources. As discussed herein, such a determination may be based on a duration of the cancellation, a frequency portion of the cancelled resources, or any combinations thereof. At 550, the base station 105-*b* may also make such a determination to decide whether to monitor the alternative resources for the uplink communication. At 555, in cases where it is determined to use the alternative resources, the UE 115-*b* may transmit the uplink transmission using the alternative resources.

Figure 6:
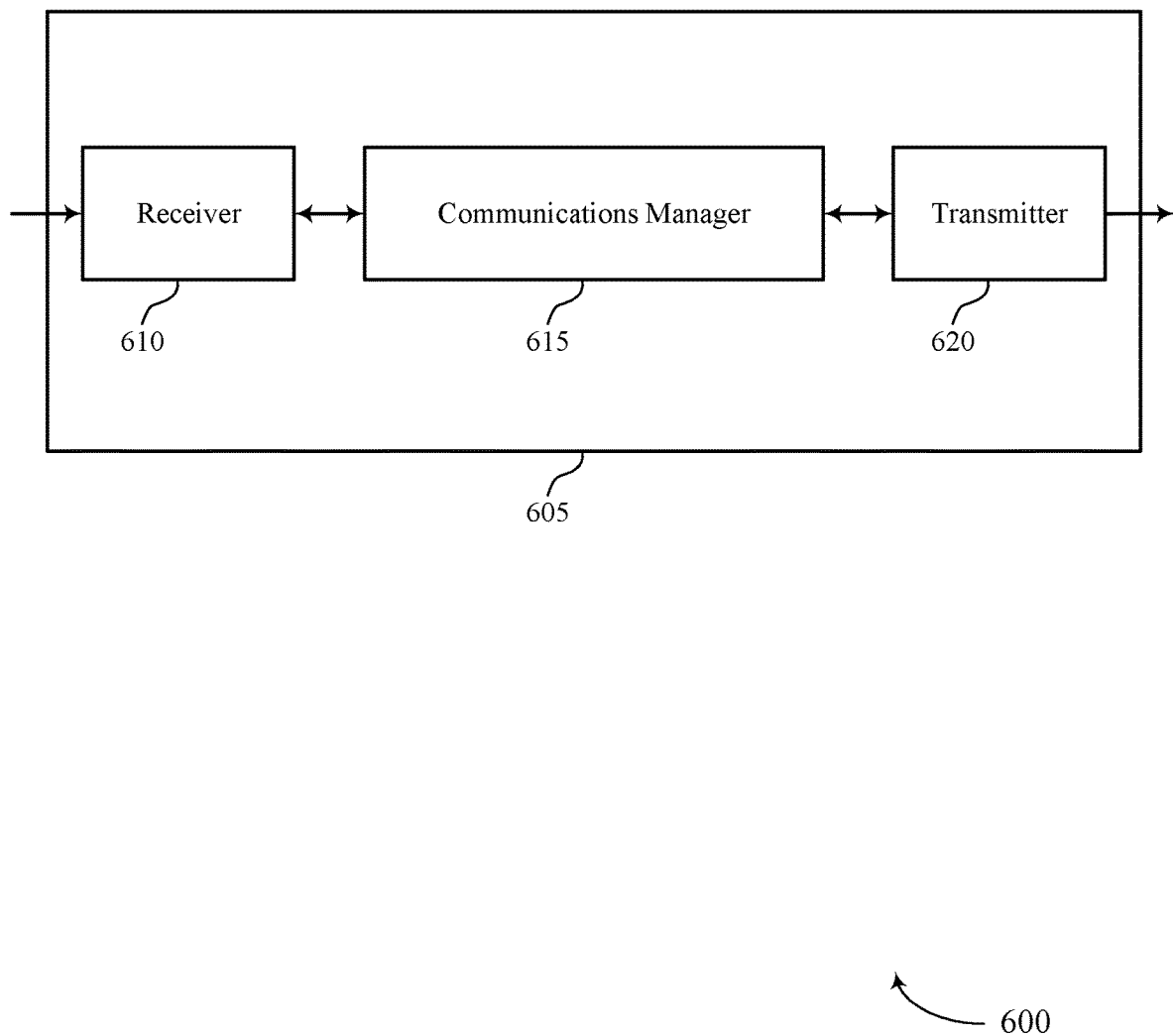
FIGS. 6 and 7 show block diagrams of devices that support alternative communication resources for configured grants in accordance with aspects of the present disclosure.

FIG. 6 shows a block diagram 600 of a device 605 that supports alternative communication resources for configured grants in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to alternative communication resources for configured grants, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may support wireless communications at a UE in accordance with examples as disclosed herein. For example, the communications manager 615 may be configured as or otherwise support a means for receiving, from a base station, a cancellation indication that indicates at least a first communication with the base station is cancelled, the first communication using first resources for communications with the base station as part of a first configured grant or as part of a dynamically scheduled grant. The communications manager 615 may be configured as or otherwise support a means for communicating with the base station using one or more alternative resources associated with a second configured grant, different from the first resources, based on the received cancellation indication.

In some cases, the communications manager 615 may be configured as or otherwise support a means for communicating a configuration with one or more parameters for transmitting, on a configured grant, a corresponding data channel repetition corresponding to a dropped dynamically scheduled data channel repetition. The communications manager 615 may be configured as or otherwise support a means for determining to drop the dropped dynamically scheduled data channel repetition. The communications manager 615 may be configured as or otherwise support a means for transmitting, based on determining to drop the dropped dynamically scheduled data channel repetition, the corresponding data channel repetition over resources of the configured grant and based on the one or more parameters.

The communications manager 615 may identify periodic resources for communications with a base station as part of a configured grant, receive, from the base station, a cancellation indication that indicates at least a first communication with the base station using the periodic resources is cancelled, and identify one or more alternative resources, different from the identified periodic resources, based on the received cancellation indication. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
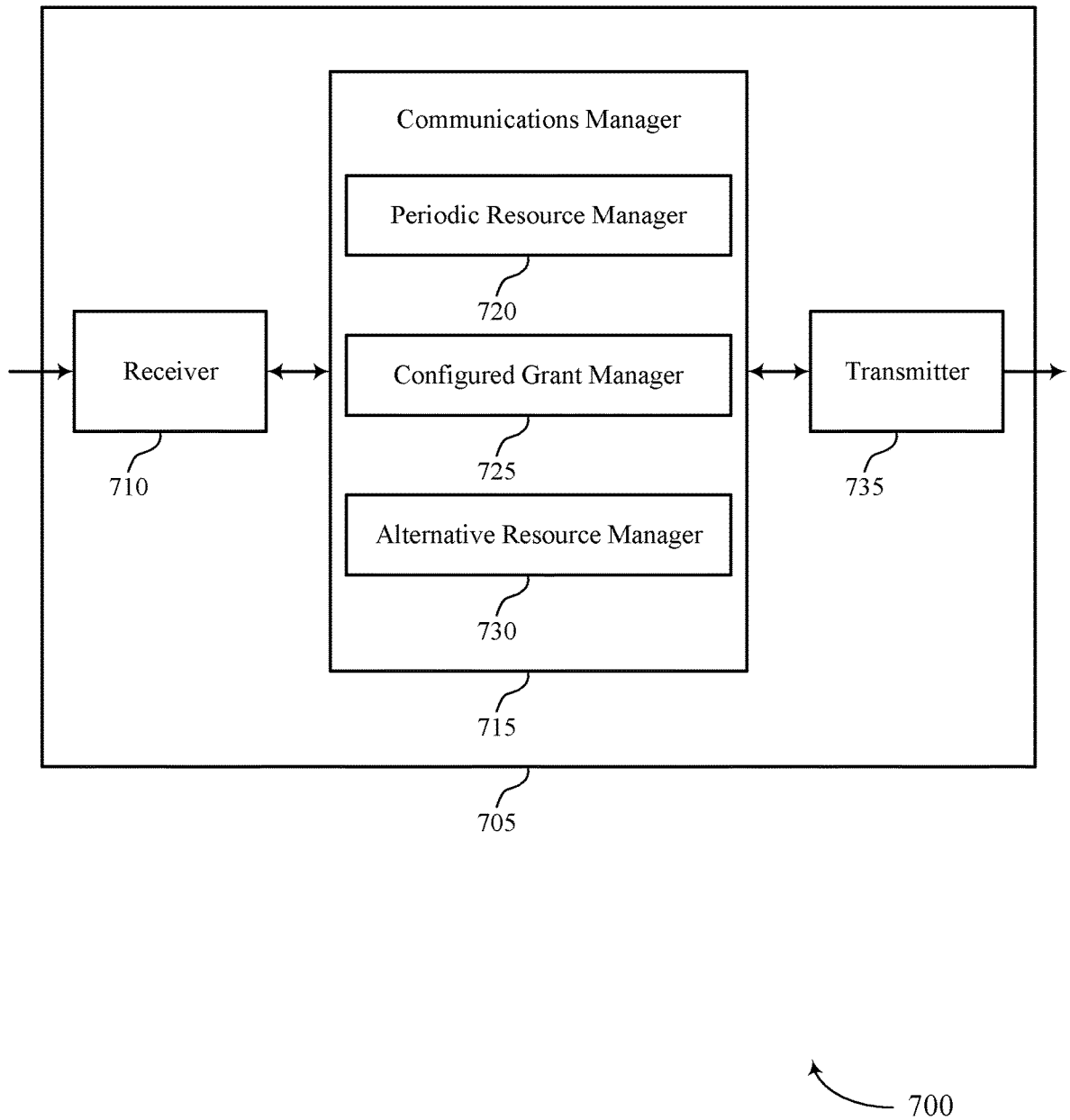

FIG. 7 shows a block diagram 700 of a device 705 that supports alternative communication resources for configured grants in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to alternative communication resources for configured grants, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a periodic resource manager 720, a configured grant manager 725, and an alternative resource manager 730. The communications manager 715 may be an example of aspects of the communications manager 910 described herein.

The communications manager 715 may support wireless communications at a UE in accordance with examples as disclosed herein. The configured grant manager 725 may be configured as or otherwise support a means for receiving, from a base station, a cancellation indication that indicates at least a first communication with the base station is cancelled, the first communication using first resources for communications with the base station as part of a first configured grant or as part of a dynamically scheduled grant. The alternative resource manager 730 may be configured as or otherwise support a means for communicating with the base station using one or more alternative resources associated with a second configured grant, different from the first resources, based on the received cancellation indication.

The periodic resource manager 720 may identify periodic resources for communications with a base station as part of a configured grant.

The configured grant manager 725 may receive, from the base station, a cancellation indication that indicates at least a first communication with the base station using the periodic resources is cancelled.

The alternative resource manager 730 may identify one or more alternative resources, different from the identified periodic resources, based on the received cancellation indication.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
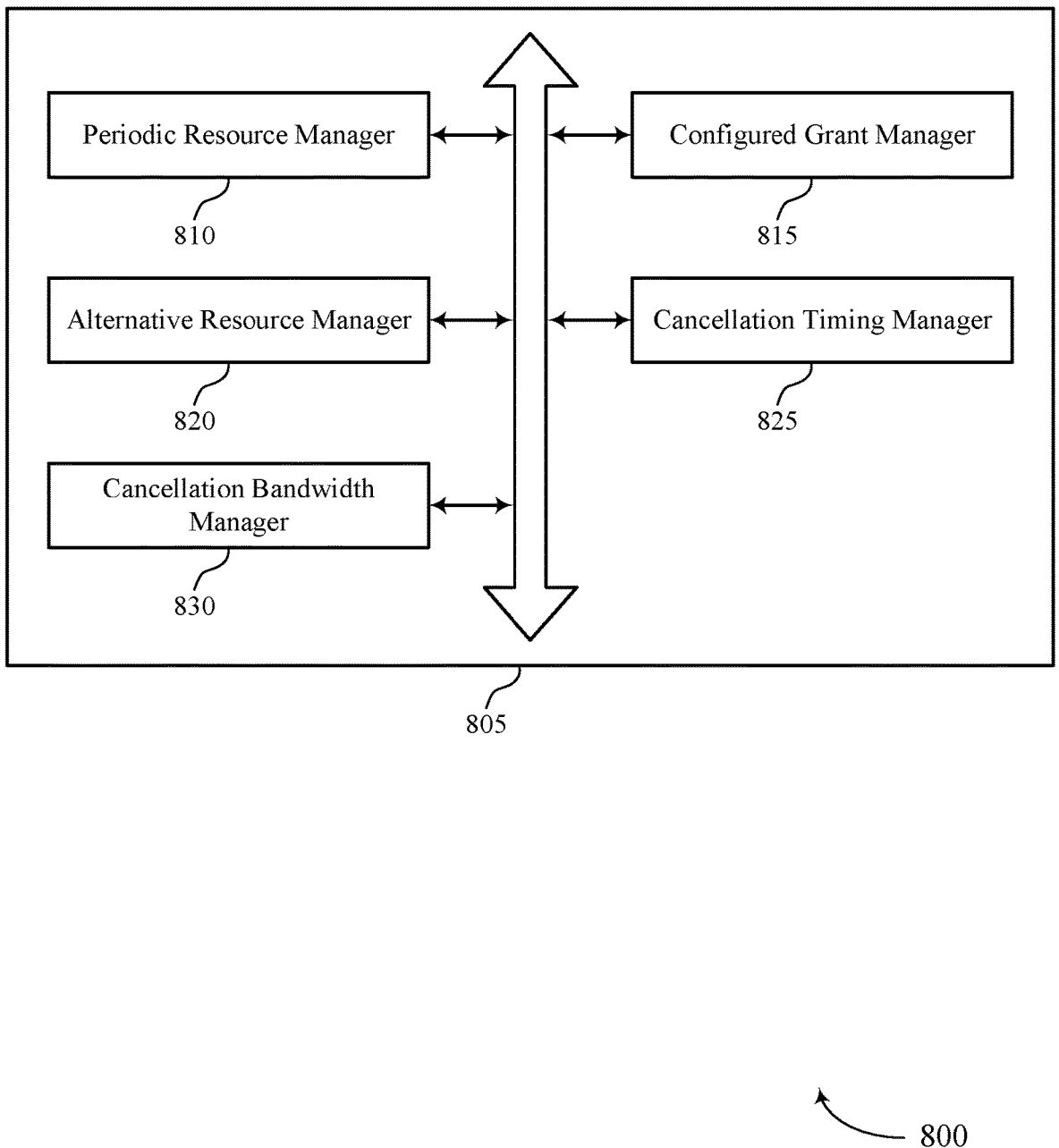
FIG. 8 shows a block diagram of a communications manager that supports alternative communication resources for configured grants in accordance with aspects of the present disclosure.

FIG. 8 shows a block diagram 800 of a communications manager 805 that supports alternative communication resources for configured grants in accordance with aspects of the present disclosure. The communications manager 805 may be an example of aspects of a communications manager 615, a communications manager 715, or a communications manager 910 described herein. The communications manager 805 may include a periodic resource manager 810, a configured grant manager 815, an alternative resource manager 820, a cancellation timing manager 825, and a cancellation bandwidth manager 830. Each of these modules may communicate, directly or indirectly, with one another (e.g., via one or more buses).

The communications manager 805 may support wireless communications at a UE in accordance with examples as disclosed herein. The configured grant manager 815 may be configured as or otherwise support a means for receiving, from a base station, a cancellation indication that indicates at least a first communication with the base station is cancelled, the first communication using first resources for communications with the base station as part of a first configured grant or as part of a dynamically scheduled grant. The alternative resource manager 820 may be configured as or otherwise support a means for communicating with the base station using one or more alternative resources associated with a second configured grant, different from the first resources, based on the received cancellation indication.

In some cases, the configured grant manager 815 may be configured as or otherwise support a means for communicating a configuration with one or more parameters for transmitting, on a configured grant, a corresponding data channel repetition corresponding to a dropped dynamically scheduled data channel repetition. The periodic resource manager 810 may be configured as or otherwise support a means for determining to drop the dropped dynamically scheduled data channel repetition. The alternative resource manager 820 may be configured as or otherwise support a means for transmitting, based on determining to drop the dropped dynamically scheduled data channel repetition, the corresponding data channel repetition over resources of the configured grant and based on the one or more parameters.

The periodic resource manager 810 may identify periodic resources for communications with a base station as part of a configured grant.

The configured grant manager 815 may receive, from the base station, a cancellation indication that indicates at least a first communication with the base station using the periodic resources is cancelled. In some examples, the configured grant manager 815 may determine, based on the received cancellation indication, whether to transmit the first communication via the one or more alternative resources.

In some examples, the configured grant manager 815 may receive, from the base station, configuration information for the configured grant and the one or more alternative resources, and one or more criteria for determining whether to use the one or more alternative resources. In some cases, the configured grant is a first configured grant of a set of configured grants that are received from the base station, and where the one or more alternative resources are associated with a second configured grant of the set of configured grants that is different than the first configured grant. In some cases, the second configured grant is identified based on a RRC configuration of a search space that is associated with a DCI communication that carries the cancellation indication.

In some cases, the second configured grant is selected based on an ordered list of the set of configured grants. In some cases, the one or more alternative resources are indicated as one or more alternative resource parameters in the configured grant that provides the periodic resources for the first communication.

The alternative resource manager 820 may identify one or more alternative resources, different from the identified periodic resources, based on the received cancellation indication. In some cases, the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof. In some cases, the one or more alternative resource parameters include one or more of secondary time resources, secondary frequency resources, a secondary beam, or any combinations thereof, that are to be used in response to the cancellation indication.

The cancellation timing manager 825 may determine to use the one or more alternative resources for transmission of the first communication based on a length of a cancellation duration provided with the cancellation indication. In some examples, the cancellation timing manager 825 may determine a time duration for using the alternative resources based on a timing of the cancellation indication relative to at least the first communication, the length of the cancellation duration, a configured time duration, or any combinations thereof. In some cases, the one or more alternative resources are used to transmit the first communication when the length of the cancellation duration meets or exceeds a time threshold, and where the UE cancels the first communication when the length of the cancellation duration is less than the time threshold.

The cancellation bandwidth manager 830 may determine one or more BWPs that are cancelled. In some cases, the alternative resources are determined based on a frequency portion identifier provided in the cancellation indication. In some cases, the frequency portion identifier indicates whether frequency resources spanning all or a portion of a BWP are cancelled.

Figure 9:
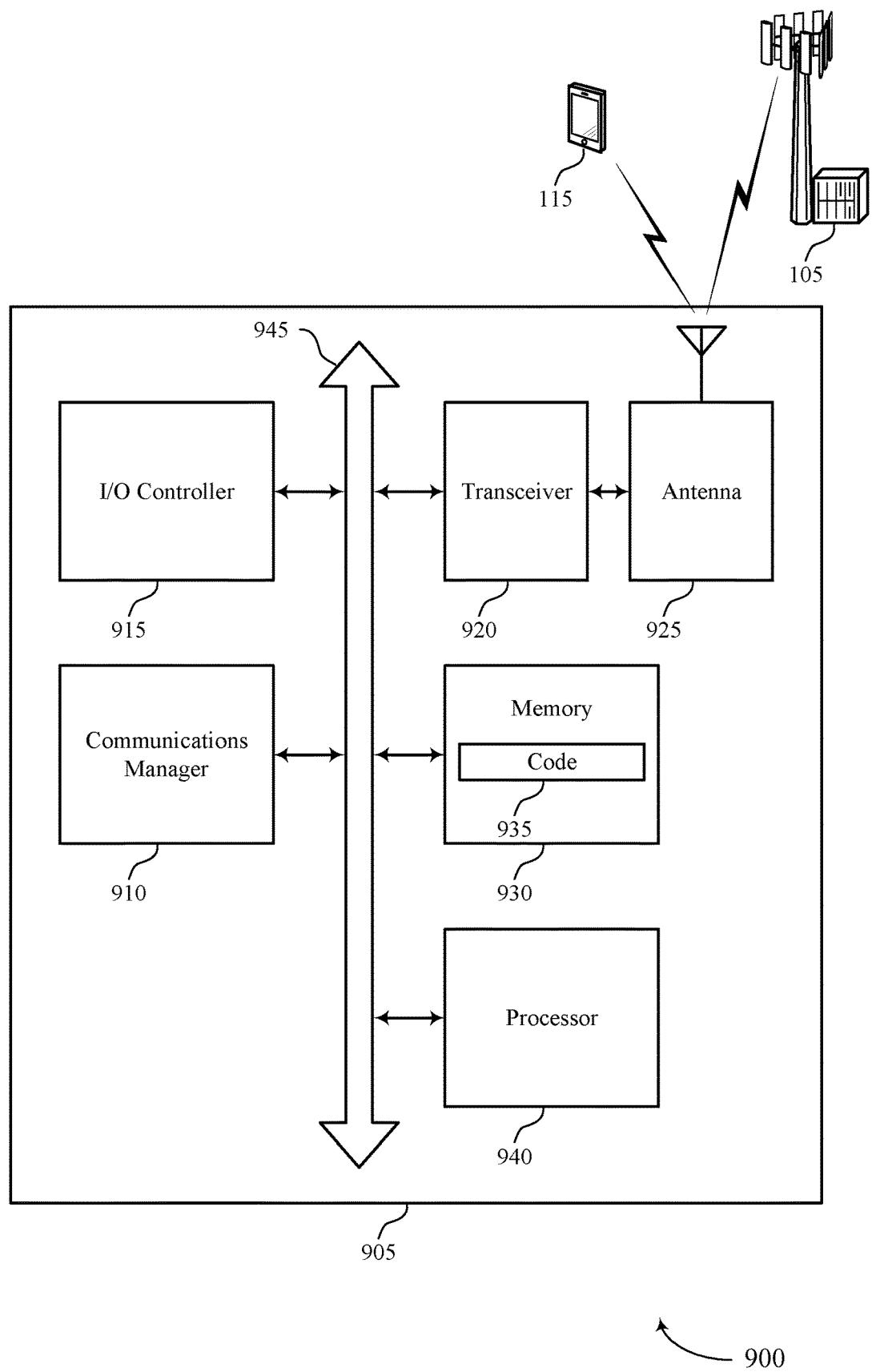
FIG. 9 shows a diagram of a system including a device that supports alternative communication resources for configured grants in accordance with aspects of the present disclosure.

FIG. 9 shows a diagram of a system 900 including a device 905 that supports alternative communication resources for configured grants in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, a memory 930, and a processor 940. These components may be in electronic communication via one or more buses (e.g., bus 945).

The communications manager 910 may support wireless communications at a UE in accordance with examples as disclosed herein. For example, the communications manager 910 may be configured as or otherwise support a means for receiving, from a base station, a cancellation indication that indicates at least a first communication with the base station is cancelled, the first communication using first resources for communications with the base station as part of a first configured grant or as part of a dynamically scheduled grant. The communications manager 910 may be configured as or otherwise support a means for communicating with the base station using one or more alternative resources associated with a second configured grant, different from the first resources, based on the received cancellation indication.

The communications manager 910 may identify periodic resources for communications with a base station as part of a configured grant, receive, from the base station, a cancellation indication that indicates at least a first communication with the base station using the periodic resources is cancelled, and identify one or more alternative resources, different from the identified periodic resources, based on the received cancellation indication.

In some cases, the communications manager 910 may be configured as or otherwise support a means for communicating a configuration with one or more parameters for transmitting, on a configured grant, a corresponding data channel repetition corresponding to a dropped dynamically scheduled data channel repetition. The communications manager 910 may be configured as or otherwise support a means for determining to drop the dropped dynamically scheduled data channel repetition. The communications manager 910 may be configured as or otherwise support a means for transmitting, based on determining to drop the dropped dynamically scheduled data channel repetition, the corresponding data channel repetition over resources of the configured grant and based on the one or more parameters.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting alternative communication resources for configured grants).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
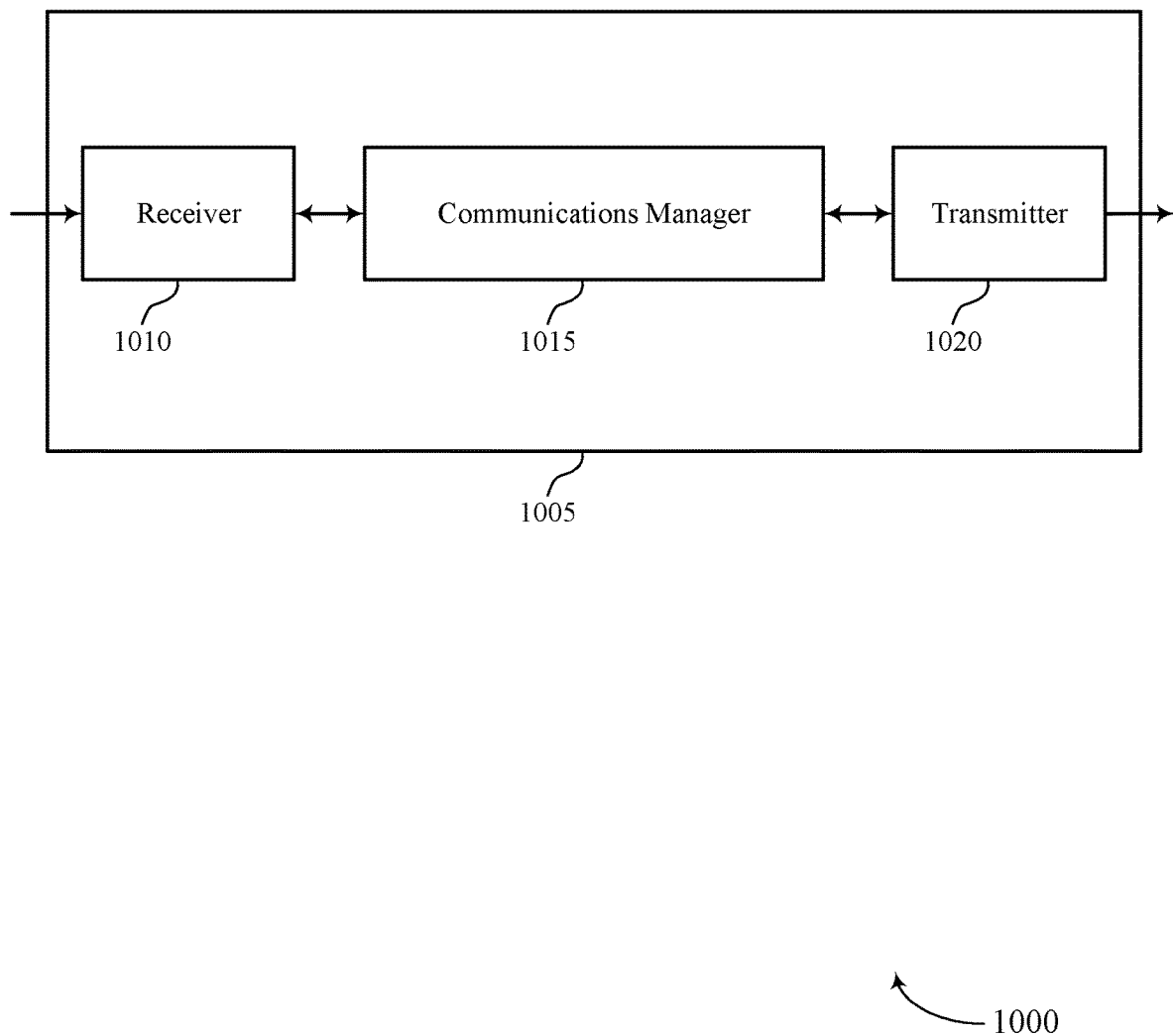
FIGS. 10 and 11 show block diagrams of devices that support alternative communication resources for configured grants in accordance with aspects of the present disclosure.

FIG. 10 shows a block diagram 1000 of a device 1005 that supports alternative communication resources for configured grants in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to alternative communication resources for configured grants, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may support wireless communications at a base station in accordance with examples as disclosed herein. For example, the communications manager 1015 may be configured as or otherwise support a means for transmitting, to a UE, one or more of a first configured grant that provides first resources for communications with the UE or a dynamically scheduled grant that provides the first resources for communications with the UE. The communications manager 1015 may be configured as or otherwise support a means for transmitting a cancellation indication to the UE that indicates at least a first communication using the first resources is cancelled. The communications manager 1015 may be configured as or otherwise support a means for communicating with the UE using one or more alternative resources associated with a second configured grant, different from the first resources, based on the cancellation indication.

The communications manager 1015 may configure a UE with a configured grant that provides periodic resources for communications with the UE, determine to cancel at least a first communication with the UE using the periodic resources, transmit a cancellation indication to the UE that indicates at least the first communication using the periodic resources is cancelled, and identify one or more alternative resources, different from the identified periodic resources, based on the cancellation indication. The communications manager 1015 may be an example of aspects of the communications manager 1310 described herein.

In some cases, the communications manager 1015 may be configured as or otherwise support a means for communicating a configuration with one or more parameters for transmitting, on a configured grant, a corresponding data channel repetition corresponding to a dropped dynamically scheduled data channel repetition that is dropped. The communications manager 1015 may be configured as or otherwise support a means for receiving the corresponding data channel repetition over resources of the configured grant and based on the one or more parameters.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
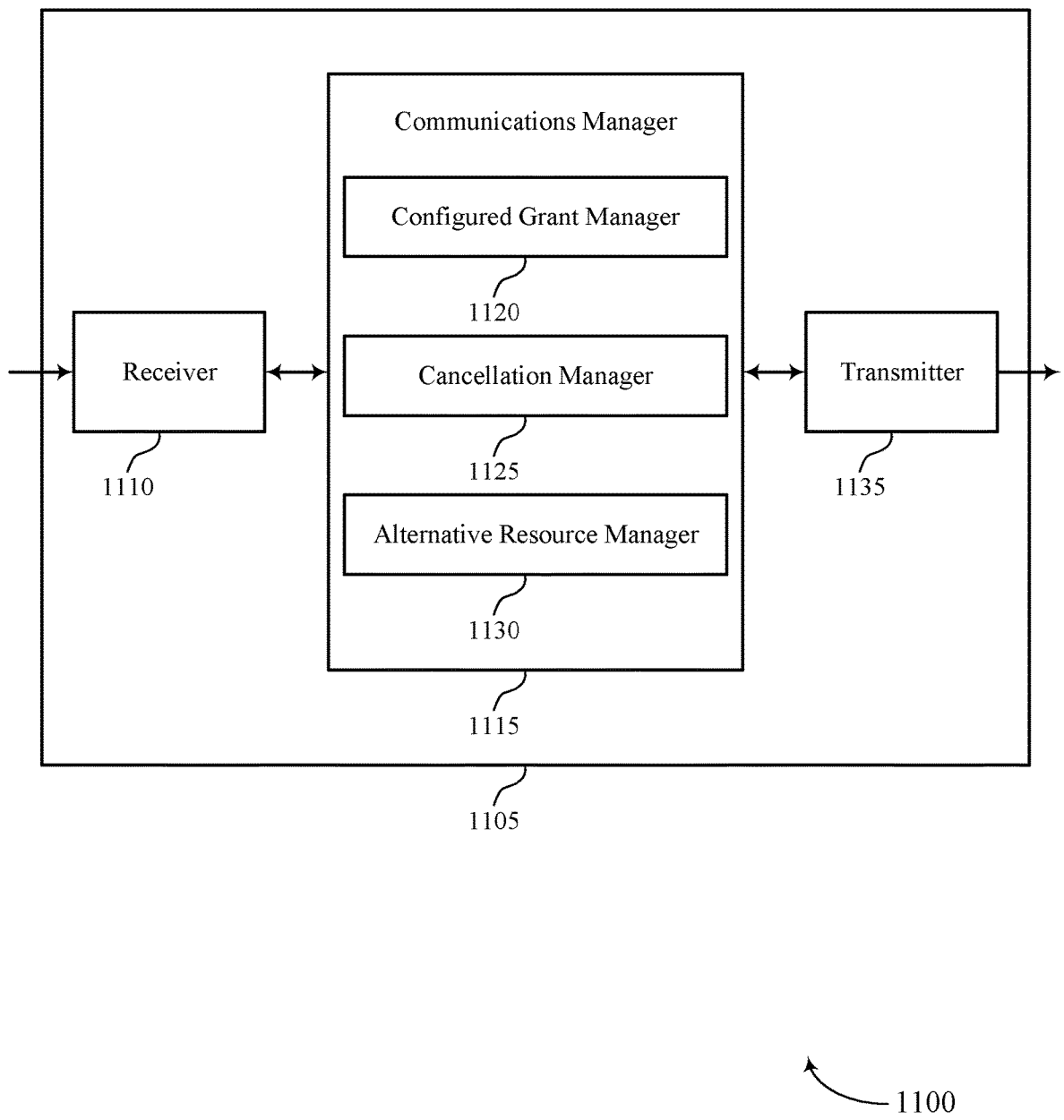

FIG. 11 shows a block diagram 1100 of a device 1105 that supports alternative communication resources for configured grants in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to alternative communication resources for configured grants, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a configured grant manager 1120, a cancellation manager 1125, and an alternative resource manager 1130. The communications manager 1115 may be an example of aspects of the communications manager 1310 described herein.

The communications manager 1115 may support wireless communications at a base station in accordance with examples as disclosed herein. The configured grant manager 1120 may be configured as or otherwise support a means for transmitting, to a UE, one or more of a first configured grant that provides first resources for communications with the UE or a dynamically scheduled grant that provides the first resources for communications with the UE. The cancellation manager 1125 may be configured as or otherwise support a means for transmitting a cancellation indication to the UE that indicates at least a first communication using the first resources is cancelled. The alternative resource manager 1130 may be configured as or otherwise support a means for communicating with the UE using one or more alternative resources associated with a second configured grant, different from the first resources, based on the cancellation indication.

In some cases, the configured grant manager 1120 may be configured as or otherwise support a means for communicating a configuration with one or more parameters for transmitting, on a configured grant, a corresponding data channel repetition corresponding to a dropped dynamically scheduled data channel repetition that is dropped. The alternative resource manager 1130 may be configured as or otherwise support a means for receiving the corresponding data channel repetition over resources of the configured grant and based on the one or more parameters.

The configured grant manager 1120 may configure a UE with a configured grant that provides periodic resources for communications with the UE.

The cancellation manager 1125 may determine to cancel at least a first communication with the UE using the periodic resources and transmit a cancellation indication to the UE that indicates at least the first communication using the periodic resources is cancelled.

The alternative resource manager 1130 may identify one or more alternative resources, different from the identified periodic resources, based on the cancellation indication.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
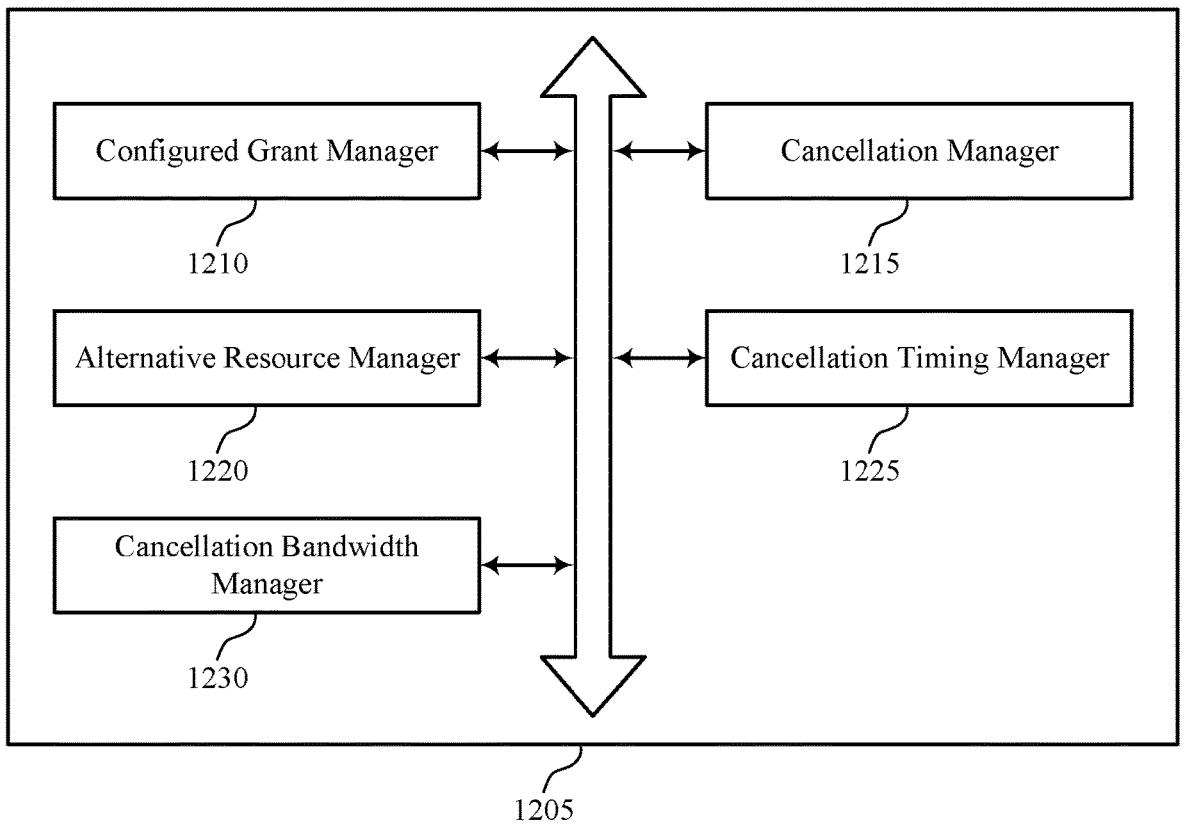
FIG. 12 shows a block diagram of a communications manager that supports alternative communication resources for configured grants in accordance with aspects of the present disclosure.

FIG. 12 shows a block diagram 1200 of a communications manager 1205 that supports alternative communication resources for configured grants in accordance with aspects of the present disclosure. The communications manager 1205 may be an example of aspects of a communications manager 1015, a communications manager 1115, or a communications manager 1310 described herein. The communications manager 1205 may include a configured grant manager 1210, a cancellation manager 1215, an alternative resource manager 1220, a cancellation timing manager 1225, and a cancellation bandwidth manager 1230. Each of these modules may communicate, directly or indirectly, with one another (e.g., via one or more buses).

The communications manager 1205 may support wireless communications at a base station in accordance with examples as disclosed herein. The configured grant manager 1210 may be configured as or otherwise support a means for transmitting, to a UE, one or more of a first configured grant that provides first resources for communications with the UE or a dynamically scheduled grant that provides the first resources for communications with the UE. The cancellation manager 1215 may be configured as or otherwise support a means for transmitting a cancellation indication to the UE that indicates at least a first communication using the first resources is cancelled. The alternative resource manager 1220 may be configured as or otherwise support a means for communicating with the UE using one or more alternative resources associated with a second configured grant, different from the first resources, based on the cancellation indication.

The configured grant manager 1210 may configure a UE with a configured grant that provides periodic resources for communications with the UE. In some examples, the configured grant manager 1210 may determine, based on the cancellation indication, whether to monitor for the first communication from the UE via the one or more alternative resources. In some examples, the configured grant manager 1210 may transmit, to the UE, configuration information for the configured grant and the one or more alternative resources, and one or more criteria for determining whether to use the one or more alternative resources in response to a cancellation indication.

In some cases, the configured grant is a first configured grant of a set of configured grants that are configured at the UE, and where the one or more alternative resources are associated with a second configured grant of the set of configured grants that is different than the first configured grant. In some cases, the second configured grant is identified based on a RRC configuration of a search space that is associated with a DCI communication that carries the cancellation indication. In some cases, the second configured grant is selected based on an ordered list of the set of configured grants.

The cancellation manager 1215 may determine to cancel at least a first communication with the UE using the periodic resources. In some examples, the cancellation manager 1215 may transmit a cancellation indication to the UE that indicates at least the first communication using the periodic resources is cancelled.

The alternative resource manager 1220 may identify one or more alternative resources, different from the identified periodic resources, based on the cancellation indication. In some cases, the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof. In some cases, the one or more alternative resources are configured as one or more alternative resource parameters in the configured grant that provides the periodic resources for the first communication. In some cases, the one or more alternative resource parameters include one or more of secondary time resources, secondary frequency resources, a secondary beam, or any combinations thereof, that are to be used in response to the cancellation indication.

The cancellation timing manager 1225 may determine to use the one or more alternative resources for the first communication based on a length of a cancellation duration provided with the cancellation indication. In some examples, the cancellation timing manager 1225 may determine a time duration for using the alternative resources based on a timing of the cancellation indication relative to at least the first communication, the length of the cancellation duration, a configured time duration, or any combinations thereof. In some cases, the one or more alternative resources for the first communication when the length of the cancellation duration meets or exceeds a time threshold, and where the UE cancels the first communication when the length of the cancellation duration is less than the time threshold.

The cancellation bandwidth manager 1230 may identify cancelled BWP(s). In some cases, the alternative resources are determined based on a frequency portion identifier provided in the cancellation indication. In some cases, the frequency portion identifier indicates whether frequency resources spanning all or a portion of a BWP are cancelled.

Figure 13:
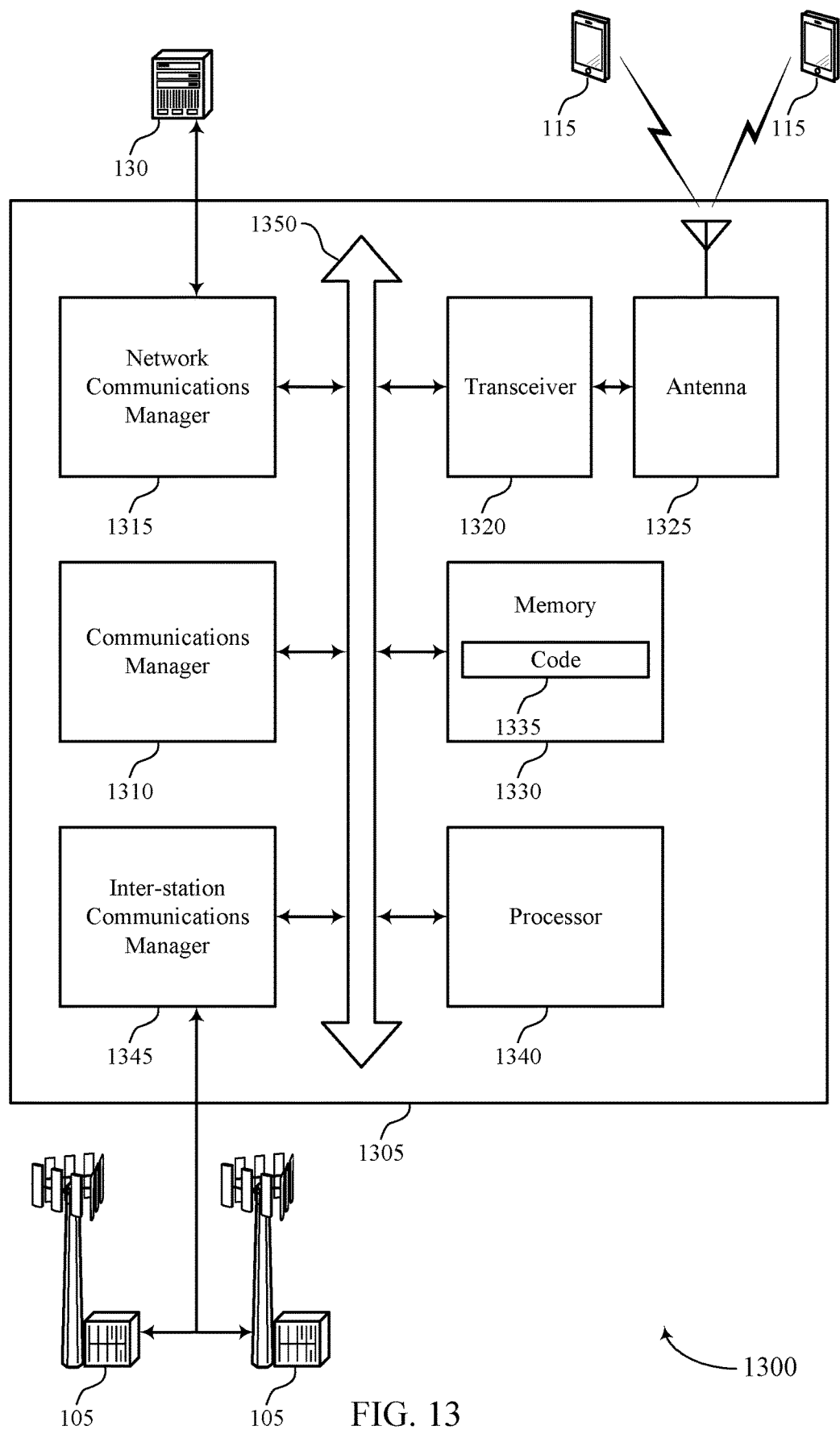
FIG. 13 shows a diagram of a system including a device that supports alternative communication resources for configured grants in accordance with aspects of the present disclosure.

FIG. 13 shows a diagram of a system 1300 including a device 1305 that supports alternative communication resources for configured grants in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may support wireless communications at a base station in accordance with examples as disclosed herein. For example, the communications manager 1310 may be configured as or otherwise support a means for transmitting, to a UE, one or more of a first configured grant that provides first resources for communications with the UE or a dynamically scheduled grant that provides the first resources for communications with the UE. The communications manager 1310 may be configured as or otherwise support a means for transmitting a cancellation indication to the UE that indicates at least a first communication using the first resources is cancelled. The communications manager 1310 may be configured as or otherwise support a means for communicating with the UE using one or more alternative resources associated with a second configured grant, different from the first resources, based on the cancellation indication.

The communications manager 1310 may configure a UE with a configured grant that provides periodic resources for communications with the UE, determine to cancel at least a first communication with the UE using the periodic resources, transmit a cancellation indication to the UE that indicates at least the first communication using the periodic resources is cancelled, and identify one or more alternative resources, different from the identified periodic resources, based on the cancellation indication.

The communications manager 1310 may support wireless communication in accordance with examples as disclosed herein. For example, the communications manager 1310 may be configured as or otherwise support a means for communicating a configuration with one or more parameters for transmitting, on a configured grant, a corresponding data channel repetition corresponding to a dropped dynamically scheduled data channel repetition that is dropped. The communications manager 1310 may be configured as or otherwise support a means for receiving the corresponding data channel repetition over resources of the configured grant and based on the one or more parameters.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting alternative communication resources for configured grants).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
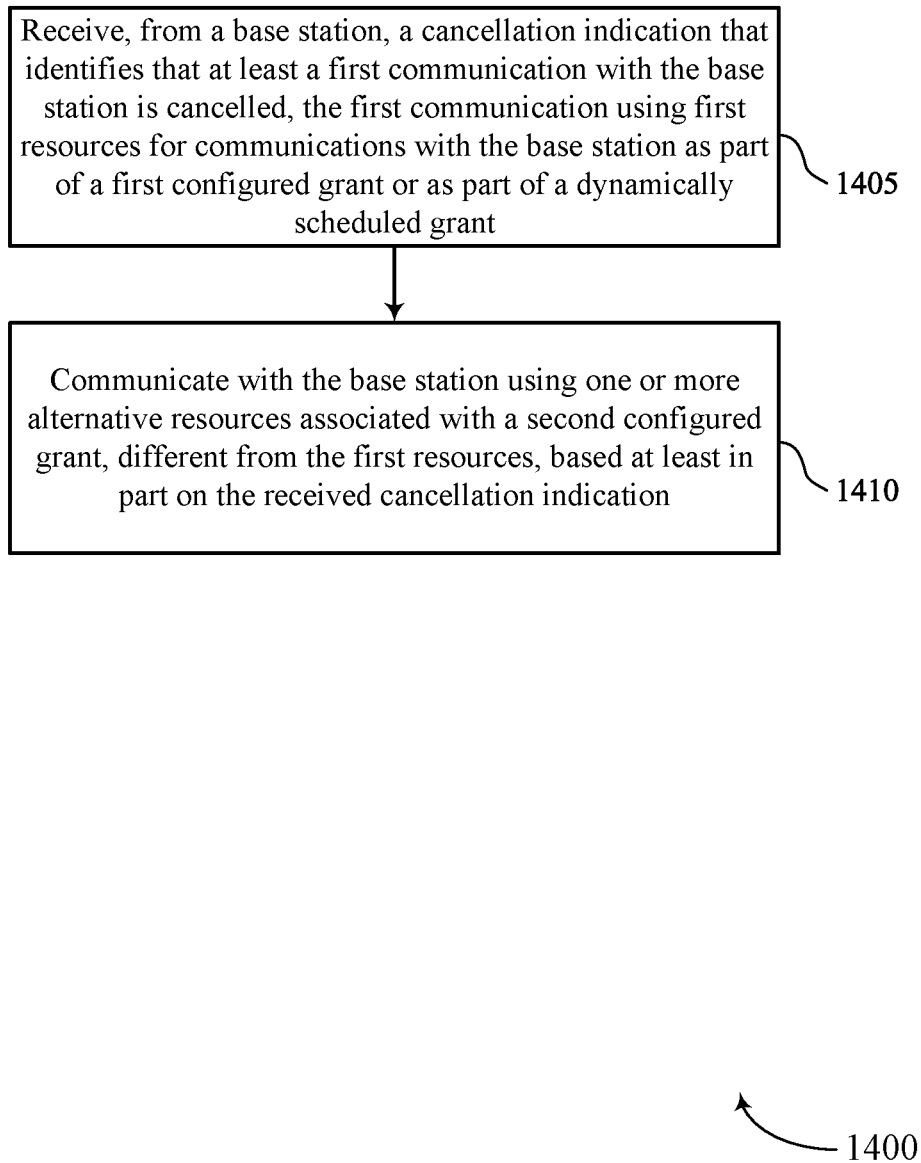
FIGS. 14 through 21 show flowcharts illustrating methods that support alternative communication resources for configured grants in accordance with aspects of the present disclosure.

FIG. 14 shows a flowchart illustrating a method 1400 that supports alternative communication resources for configured grants in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a cancellation indication that indicates at least a first communication with the base station is cancelled, the first communication using first resources for communications with the base station as part of a first configured grant or as part of a dynamically scheduled grant. The operations of 1405 may be performed in accordance with examples as disclosed herein. In some examples, aspects of the operations of 1405 may be performed by a configured grant manager 815 as described with reference to FIG. 8.

At 1410, the method may include communicating with the base station using one or more alternative resources associated with a second configured grant, different from the first resources, based on the received cancellation indication. The operations of 1410 may be performed in accordance with examples as disclosed herein. In some examples, aspects of the operations of 1410 may be performed by an alternative resource manager 820 as described with reference to FIG. 8.

Figure 15:
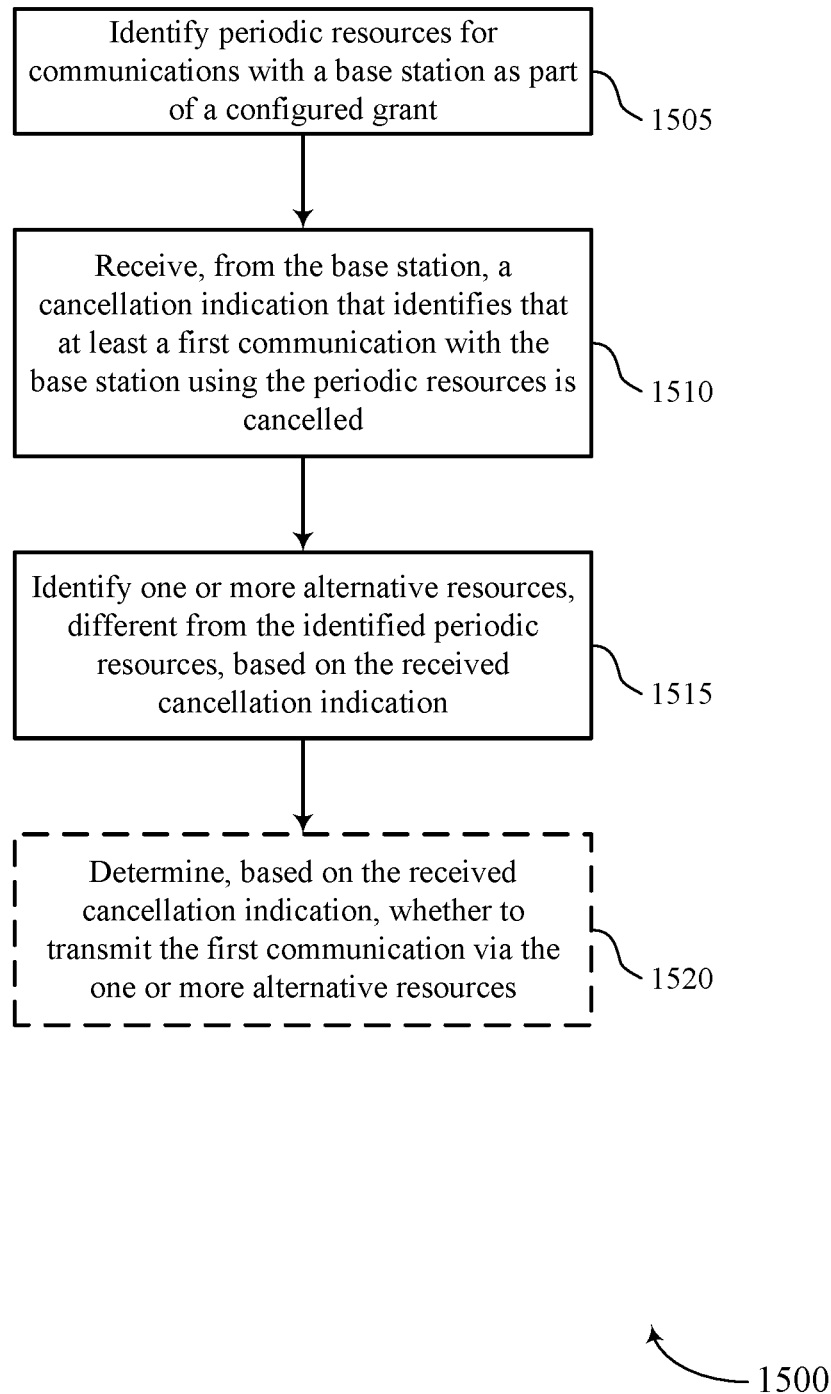

FIG. 15 shows a flowchart illustrating a method 1500 that supports alternative communication resources for configured grants in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below.

Additionally or alternatively, a UE may perform aspects of the functions described below using special-purpose hardware.

At 1505, the UE may identify periodic resources for communications with a base station as part of a configured grant. The operations of 1505 may be performed according to the methods described herein. In some examples, aspects of the operations of 1505 may be performed by a periodic resource manager as described with reference to FIGS. 6 through 9.

At 1510, the UE may receive, from the base station, a cancellation indication that indicates at least a first communication with the base station using the periodic resources is cancelled. The operations of 1510 may be performed according to the methods described herein. In some examples, aspects of the operations of 1510 may be performed by a configured grant manager as described with reference to FIGS. 6 through 9.

At 1515, the UE may identify one or more alternative resources, different from the identified periodic resources, based on the received cancellation indication. The operations of 1515 may be performed according to the methods described herein. In some examples, aspects of the operations of 1515 may be performed by an alternative resource manager as described with reference to FIGS. 6 through 9.

Optionally, at 1520, the UE may determine, based on the received cancellation indication, whether to transmit the first communication via the one or more alternative resources. The operations of 1520 may be performed according to the methods described herein. In some examples, aspects of the operations of 1520 may be performed by a configured grant manager as described with reference to FIGS. 6 through 9.

Figure 16:
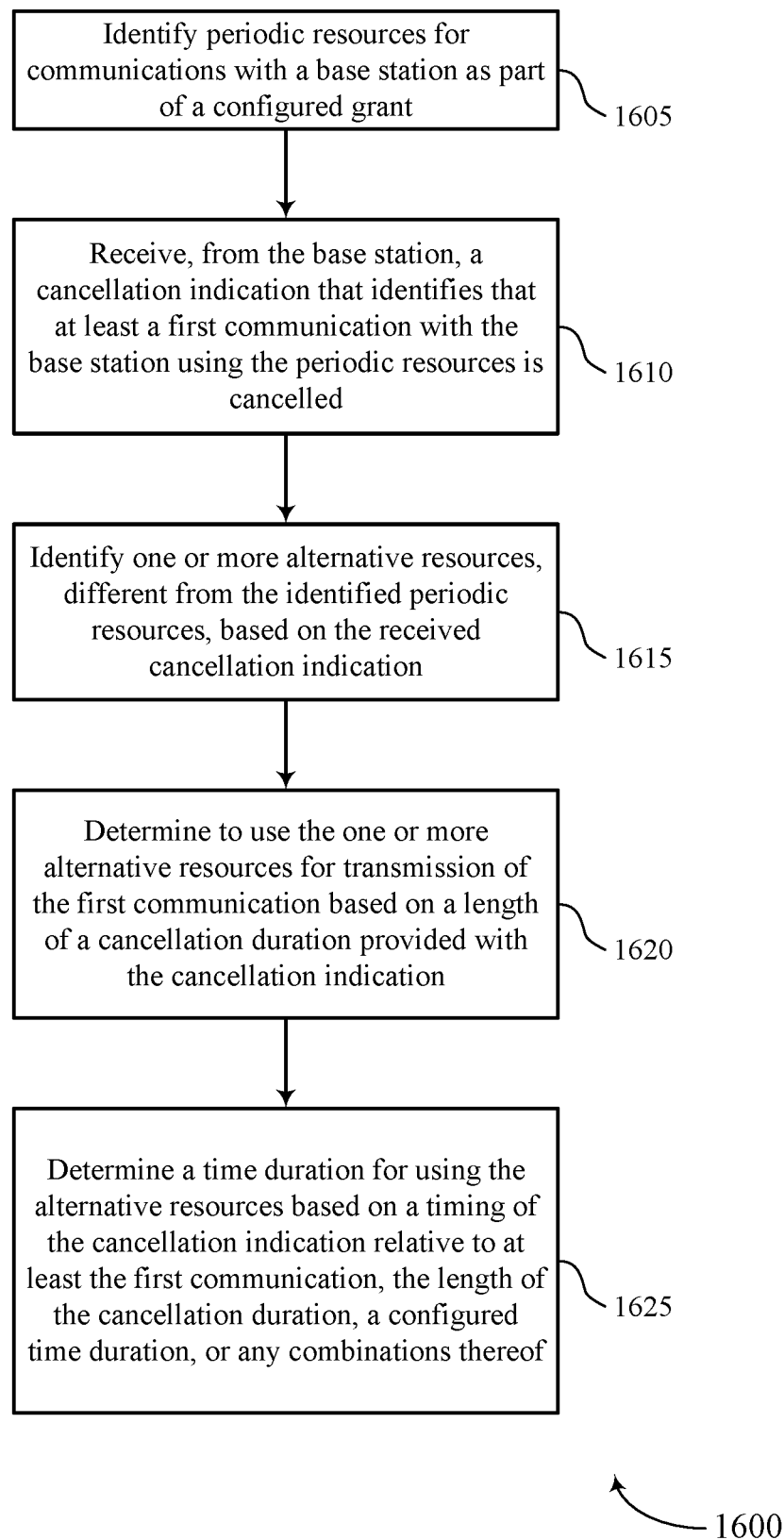

FIG. 16 shows a flowchart illustrating a method 1600 that supports alternative communication resources for configured grants in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may identify periodic resources for communications with a base station as part of a configured grant. The operations of 1605 may be performed according to the methods described herein. In some examples, aspects of the operations of 1605 may be performed by a periodic resource manager as described with reference to FIGS. 6 through 9.

At 1610, the UE may receive, from the base station, a cancellation indication that indicates at least a first communication with the base station using the periodic resources is cancelled. The operations of 1610 may be performed according to the methods described herein. In some examples, aspects of the operations of 1610 may be performed by a configured grant manager as described with reference to FIGS. 6 through 9.

At 1615, the UE may identify one or more alternative resources, different from the identified periodic resources, based on the received cancellation indication. The operations of 1615 may be performed according to the methods described herein. In some examples, aspects of the operations of 1615 may be performed by an alternative resource manager as described with reference to FIGS. 6 through 9.

At 1620, the UE may determine to use the one or more alternative resources for transmission of the first communication based on a length of a cancellation duration provided with the cancellation indication. The operations of 1620 may be performed according to the methods described herein. In some examples, aspects of the operations of 1620 may be performed by a cancellation timing manager as described with reference to FIGS. 6 through 9.

At 1625, the UE may determine a time duration for using the alternative resources based on a timing of the cancellation indication relative to at least the first communication, the length of the cancellation duration, a configured time duration, or any combinations thereof. The operations of 1625 may be performed according to the methods described herein. In some examples, aspects of the operations of 1625 may be performed by a cancellation timing manager as described with reference to FIGS. 6 through 9.

Figure 17:
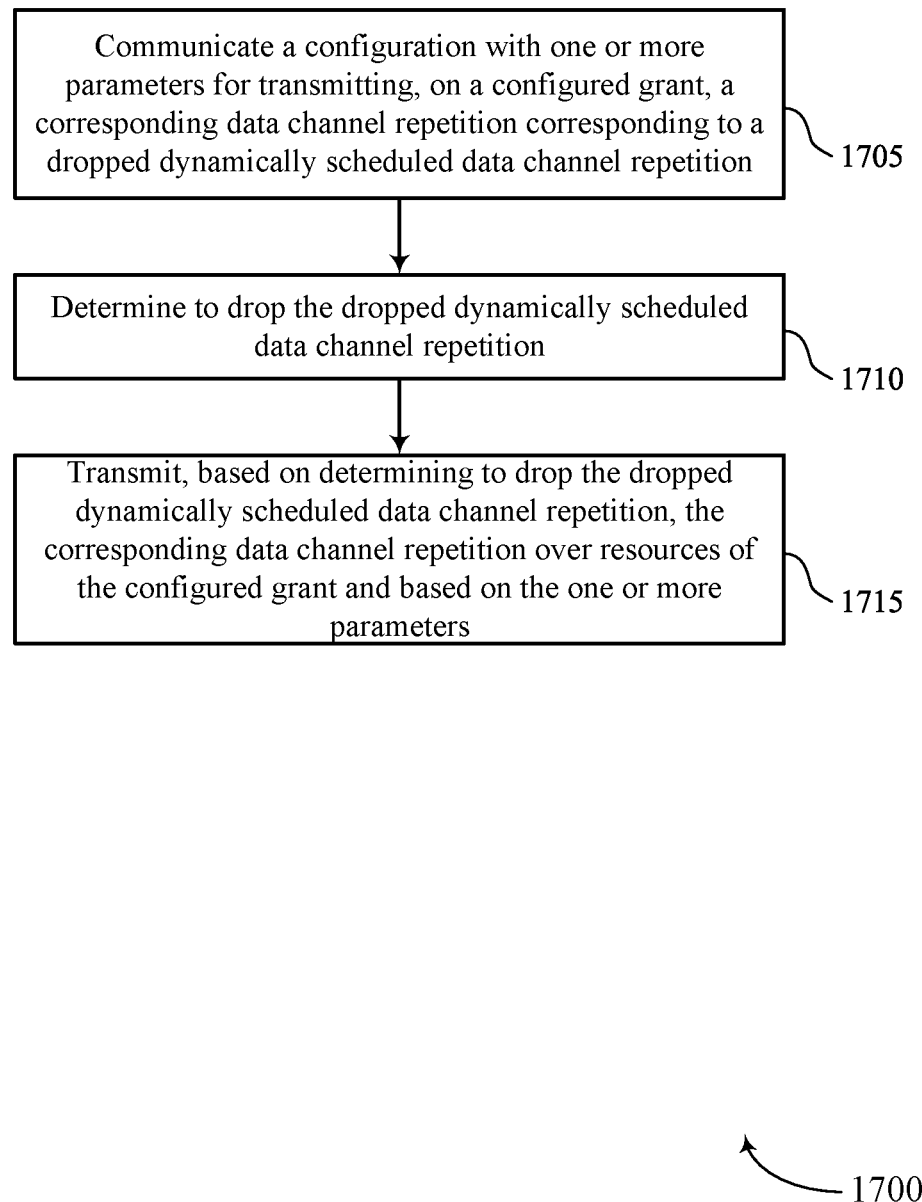

FIG. 17 shows a flowchart illustrating a method 1700 that supports alternative communication resources for configured grants in accordance with aspects of the present disclosure. The operations of the method 1700 may be implemented by a UE or its components as described herein. For example, the operations of the method 1700 may be performed by a UE as described with reference to FIGS. 6 through 9. In some examples, a UE may execute a set of instructions to control the functional elements of the UE to perform the described functions. Additionally or alternatively, the UE may perform aspects of the described functions using special-purpose hardware.

At 1705, the method may include communicating a configuration with one or more parameters for transmitting, on a configured grant, a corresponding data channel repetition corresponding to a dropped dynamically scheduled data channel repetition. The operations of 1705 may be performed in accordance with examples as disclosed herein. In some examples, aspects of the operations of 1705 may be performed by a configured grant manager 725 as described with reference to FIGS. 6 through 9.

At 1710, the method may include determining to drop the dropped dynamically scheduled data channel repetition. The operations of 1710 may be performed in accordance with examples as disclosed herein. In some examples, aspects of the operations of 1710 may be performed by a periodic resource manager 720 as described with reference to FIGS. 6 through 9.

At 1715, the method may include transmitting, based on determining to drop the dropped dynamically scheduled data channel repetition, the corresponding data channel repetition over resources of the configured grant and based on the one or more parameters. The operations of 1715 may be performed in accordance with examples as disclosed herein. In some examples, aspects of the operations of 1715 may be performed by an alternative resource manager 730 as described with reference to FIGS. 6 through 9.

Figure 18:
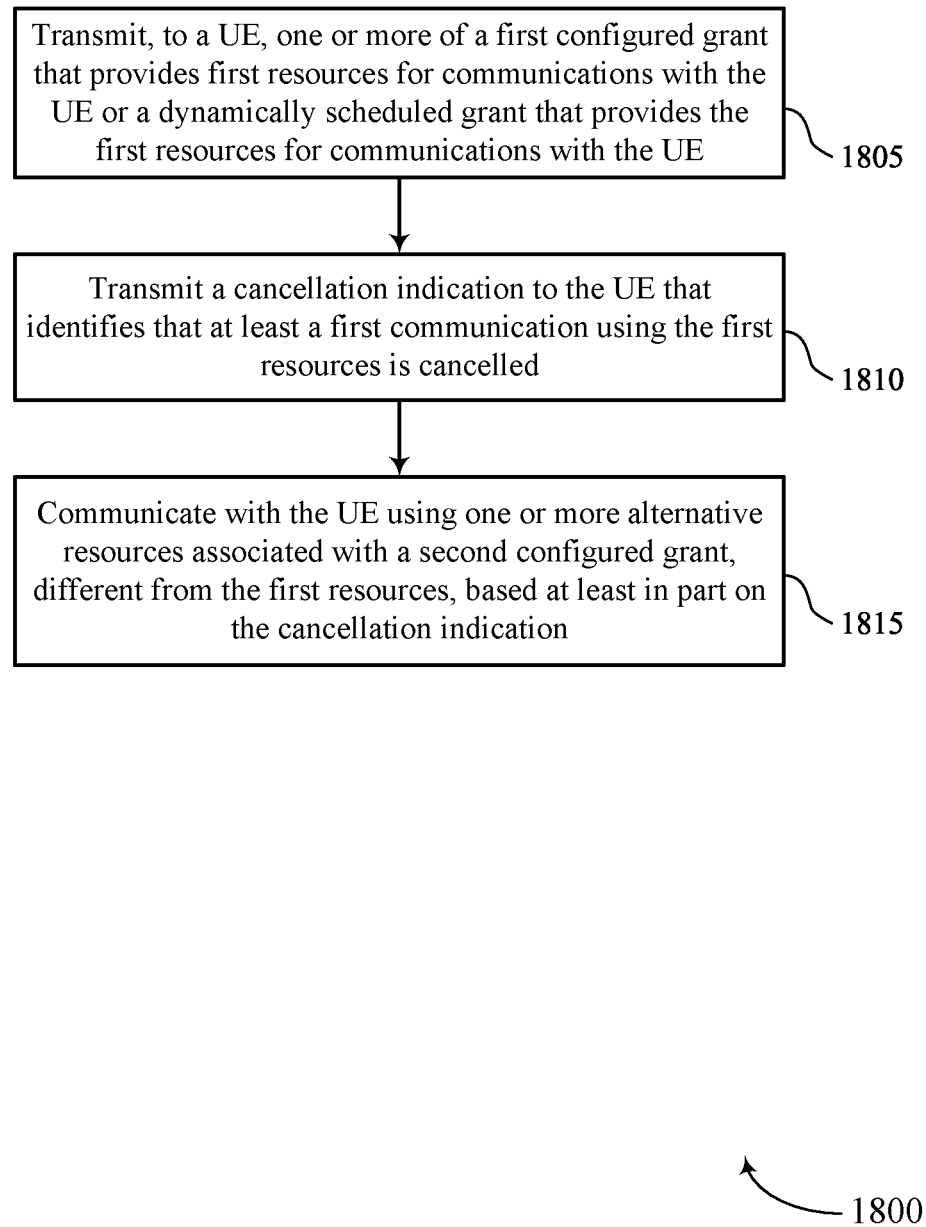

FIG. 18 shows a flowchart illustrating a method 1800 that supports alternative communication resources for configured grants in accordance with aspects of the present disclosure. The operations of the method 1800 may be implemented by a base station or its components as described herein. For example, the operations of the method 1800 may be performed by a base station 105 as described with reference to FIGS. 1 through 5, and 10 through 13. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, one or more of a first configured grant that provides first resources for communications with the UE or a dynamically scheduled grant that provides the first resources for communications with the UE. The operations of 1805 may be performed in accordance with examples as disclosed herein. In some examples, aspects of the operations of 1805 may be performed by a configured grant manager 1210 as described with reference to FIG. 12.

At 1810, the method may include transmitting a cancellation indication to the UE that indicates at least a first communication using the first resources is cancelled. The operations of 1810 may be performed in accordance with examples as disclosed herein. In some examples, aspects of the operations of 1810 may be performed by a cancellation manager 1215 as described with reference to FIG. 12.

At 1815, the method may include communicating with the UE using one or more alternative resources associated with a second configured grant, different from the first resources, based on the cancellation indication. The operations of 1815 may be performed in accordance with examples as disclosed herein. In some examples, aspects of the operations of 1815 may be performed by an alternative resource manager 1235 as described with reference to FIG. 12.

Figure 19:
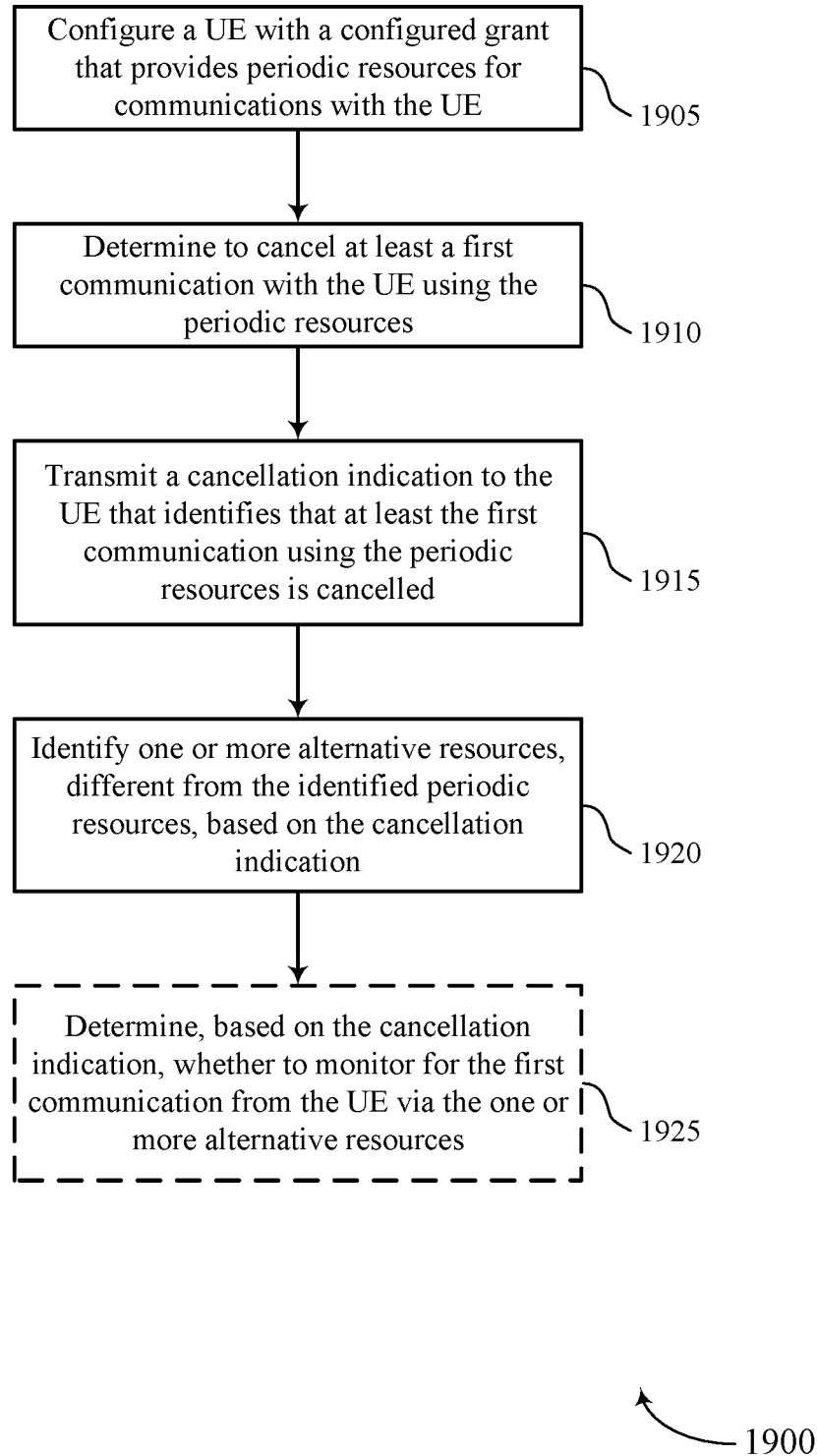

FIG. 19 shows a flowchart illustrating a method 1900 that supports alternative communication resources for configured grants in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may configure a UE with a configured grant that provides periodic resources for communications with the UE. The operations of 1905 may be performed according to the methods described herein. In some examples, aspects of the operations of 1905 may be performed by a configured grant manager as described with reference to FIGS. 10 through 13.

At 1910, the base station may determine to cancel at least a first communication with the UE using the periodic resources. The operations of 1910 may be performed according to the methods described herein. In some examples, aspects of the operations of 1910 may be performed by a cancellation manager as described with reference to FIGS. 10 through 13.

At 1915, the base station may transmit a cancellation indication to the UE that indicates at least the first communication using the periodic resources is cancelled. The operations of 1915 may be performed according to the methods described herein. In some examples, aspects of the operations of 1915 may be performed by a cancellation manager as described with reference to FIGS. 10 through 13.

At 1920, the base station may identify one or more alternative resources, different from the identified periodic resources, based on the cancellation indication. The operations of 1920 may be performed according to the methods described herein. In some examples, aspects of the operations of 1920 may be performed by an alternative resource manager as described with reference to FIGS. 10 through 13.

Optionally, at 1925, the base station may determine, based on the cancellation indication, whether to monitor for the first communication from the UE via the one or more alternative resources. The operations of 1925 may be performed according to the methods described herein. In some examples, aspects of the operations of 1925 may be performed by a configured grant manager as described with reference to FIGS. 10 through 13.

Figure 20:
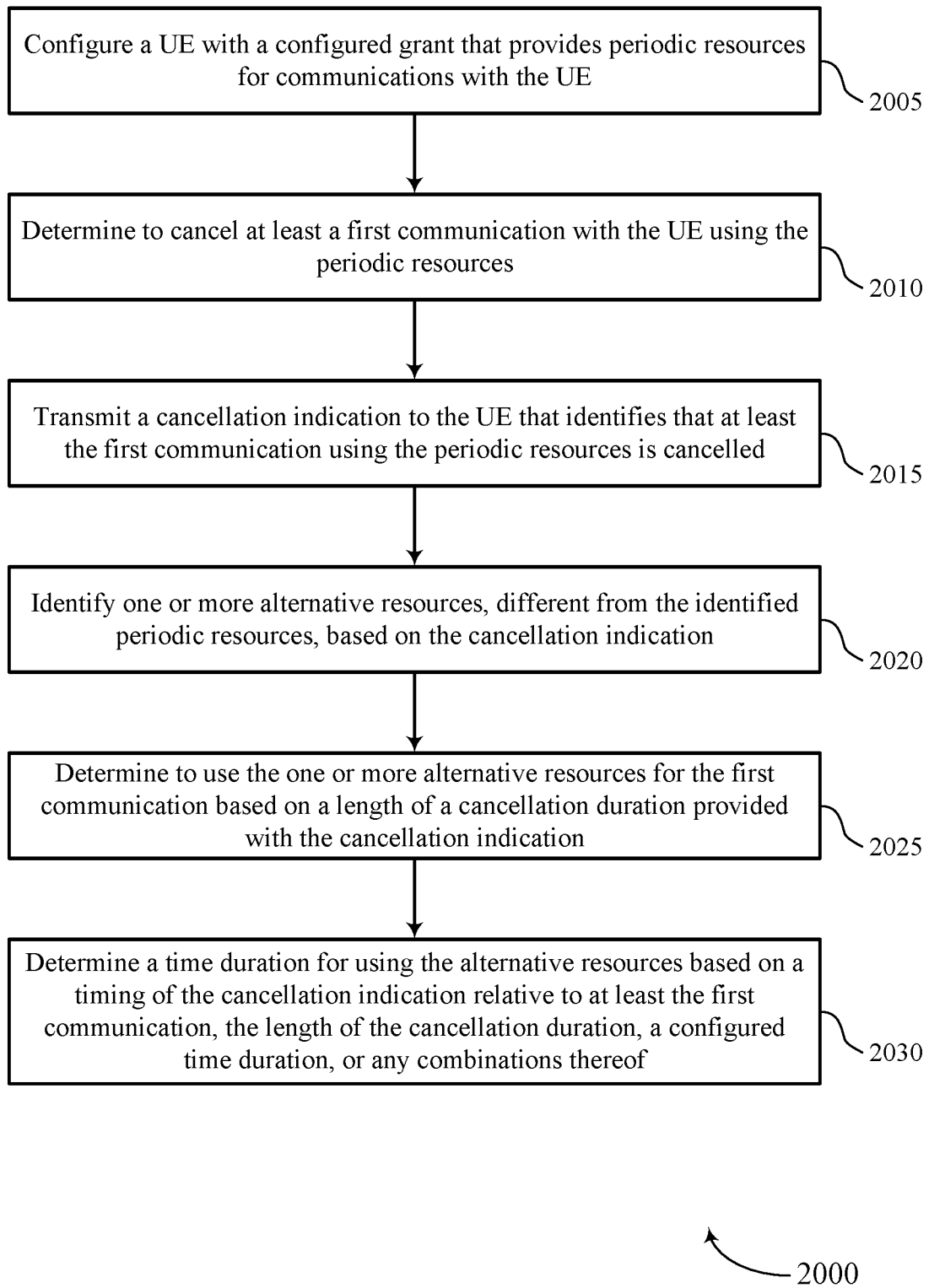

FIG. 20 shows a flowchart illustrating a method 2000 that supports alternative communication resources for configured grants in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may configure a UE with a configured grant that provides periodic resources for communications with the UE. The operations of 2005 may be performed according to the methods described herein. In some examples, aspects of the operations of 2005 may be performed by a configured grant manager as described with reference to FIGS. 10 through 13.

At 2010, the base station may determine to cancel at least a first communication with the UE using the periodic resources. The operations of 2010 may be performed according to the methods described herein. In some examples, aspects of the operations of 2010 may be performed by a cancellation manager as described with reference to FIGS. 10 through 13.

At 2015, the base station may transmit a cancellation indication to the UE that indicates at least the first communication using the periodic resources is cancelled. The operations of 2015 may be performed according to the methods described herein. In some examples, aspects of the operations of 2015 may be performed by a cancellation manager as described with reference to FIGS. 10 through 13.

At 2020, the base station may identify one or more alternative resources, different from the identified periodic resources, based on the cancellation indication. The operations of 2020 may be performed according to the methods described herein. In some examples, aspects of the operations of 2020 may be performed by an alternative resource manager as described with reference to FIGS. 10 through 13.

At 2025, the base station may determine to use the one or more alternative resources for the first communication based on a length of a cancellation duration provided with the cancellation indication. The operations of 2025 may be performed according to the methods described herein. In some examples, aspects of the operations of 2025 may be performed by a cancellation timing manager as described with reference to FIGS. 10 through 13.

At 2030, the base station may determine a time duration for using the alternative resources based on a timing of the cancellation indication relative to at least the first communication, the length of the cancellation duration, a configured time duration, or any combinations thereof. The operations of 2030 may be performed according to the methods described herein. In some examples, aspects of the operations of 2030 may be performed by a cancellation timing manager as described with reference to FIGS. 10 through 13.

Figure 21:
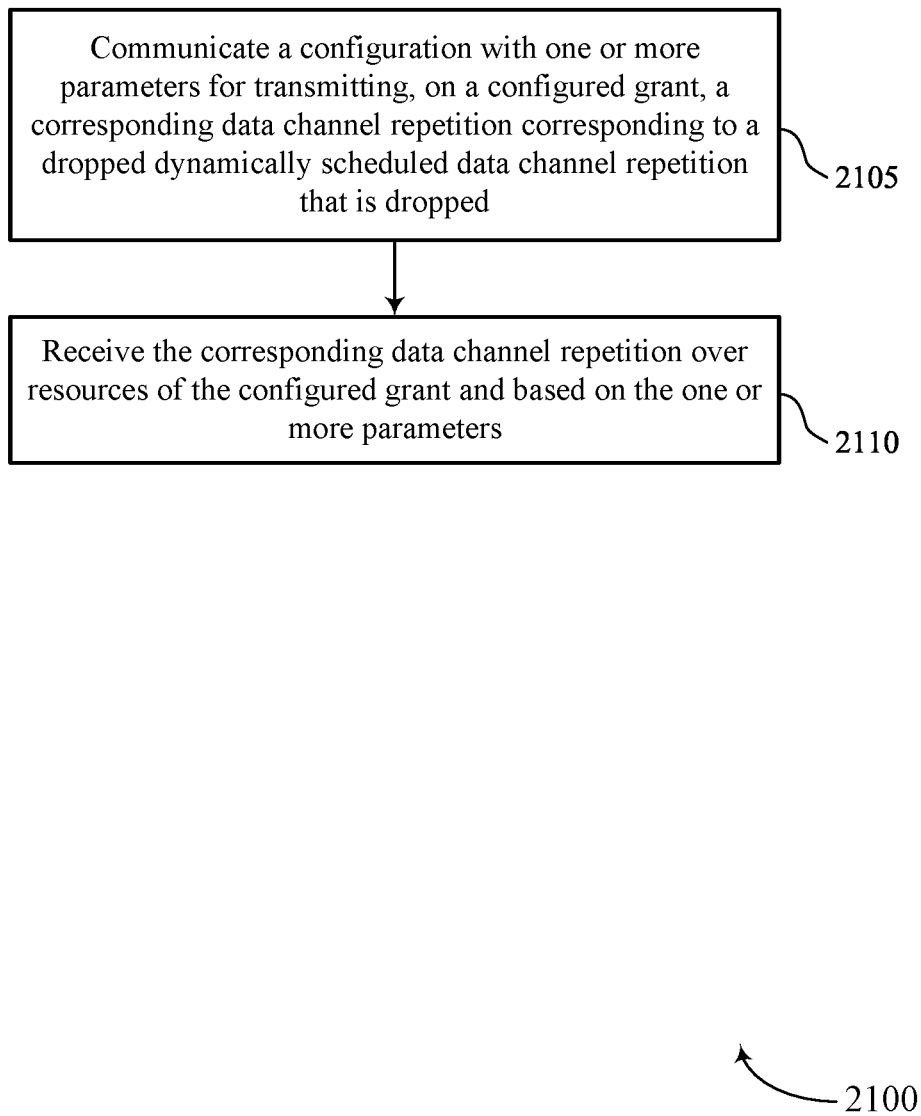

FIG. 21 shows a flowchart illustrating a method 2100 that supports alternative communication resources for configured grants in accordance with aspects of the present disclosure. The operations of the method 2100 may be implemented by a base station or its components as described herein. For example, the operations of the method 2100 may be performed by a base station 105 as described with reference to FIGS. 1, 2, and 10 through 13. In some examples, a base station may execute a set of instructions to control the functional elements of the base station to perform the described functions. Additionally or alternatively, the base station may perform aspects of the described functions using special-purpose hardware.

At 2105, the method may include communicating a configuration with one or more parameters for transmitting, on a configured grant, a corresponding data channel repetition corresponding to a dropped dynamically scheduled data channel repetition that is dropped. The operations of 2105 may be performed in accordance with examples as disclosed herein. In some examples, aspects of the operations of 2105 may be performed by a configured grant manager 1120 as described with reference to FIGS. 10 through 13.

At 2110, the method may include receiving the corresponding data channel repetition over resources of the configured grant and based on the one or more parameters. The operations of 2110 may be performed in accordance with examples as disclosed herein. In some examples, aspects of the operations of 2110 may be performed by an alternative resource manager 1130 as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

- Aspect 1: A method for wireless communications at a UE, comprising: receiving, from a base station, a cancellation indication that indicates at least a first communication with the base station is cancelled, the first communication using first resources for communications with the base station as part of a first configured grant or as part of a dynamically scheduled grant; and communicating with the base station using one or more alternative resources associated with a second configured grant, different from the first resources, based at least in part on the received cancellation indication.
- Aspect 2: The method of aspect 1, wherein the first configured grant is one of a plurality of configured grants that are received from the base station, and the one or more alternative resources are associated with the second configured grant of the plurality of configured grants that is different than the first configured grant.
- Aspect 3: The method of aspect 2, wherein the second configured grant is identified based at least in part on an RRC configuration of a search space that is associated with a DCI communication that carries the cancellation indication.
- Aspect 4: The method of any of aspects 2 through 3, wherein the second configured grant is selected based at least in part on an ordered list of the plurality of configured grants.
- Aspect 5: The method of any of aspects 1 through 4, further comprising: determining, based at least in part on the received cancellation indication, whether to transmit the first communication via the one or more alternative resources.
- Aspect 6: The method of any of aspects 1 through 5, further comprising: receiving, from the base station, configuration information for at least the second configured grant, and one or more criteria for determining whether to use the one or more alternative resources associated with the second configured grant.
- Aspect 7: The method of aspect 6, wherein the one or more criteria for determining whether to use the one or more alternative resources when the first communication is part of the first configured grant include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.
- Aspect 8: The method of aspect 6, wherein the one or more criteria for determining whether to use the one or more alternative resources when the first communication is part of the dynamically scheduled grant include one or more of a hybrid automatic repeat request (HARQ) identifier associated with the first communication, a repetition number of the first communication, or an indication of whether a transport block size follows the first communication, or any combinations thereof.
- Aspect 9: The method of any of aspects 1 through 7, wherein the one or more alternative resources are indicated as one or more alternative resource parameters in the first configured grant that provides the first periodic resources for the first communication, wherein the one or more alternative resource parameters include one or more of secondary time resources, secondary frequency resources, a secondary beam, or any combinations thereof, that are to be used in response to the cancellation indication.
- Aspect 10: The method of any of aspects 1 through 9, further comprising: determining to use the one or more alternative resources for transmission of the first communication based at least in part on a length of a cancellation duration provided with the cancellation indication.
- Aspect 11: The method of aspect 10, further comprising: determining a time duration for using the one or more alternative resources based at least in part on a timing of the cancellation indication relative to at least the first communication, the length of the cancellation duration, a configured time duration, or any combinations thereof.
- Aspect 12: The method of any of aspects 10 through 11, wherein the one or more alternative resources are used to transmit the first communication when the length of the cancellation duration meets or exceeds a time threshold, and the UE cancels the first communication when the length of the cancellation duration is less than the time threshold.
- Aspect 13: The method of any of aspects 1 through 12, wherein the one or more alternative resources are determined based at least in part on a frequency portion identifier provided in the cancellation indication.
- Aspect 14: The method of aspect 13, wherein the frequency portion identifier indicates whether frequency resources spanning all or a portion of a bandwidth part (BWP) are cancelled.

Aspect 15: A method for wireless communications at a base station, comprising: transmitting, to a UE, one or more of a first configured grant that provides first resources for communications with the UE or a dynamically scheduled grant that provides the first resources for communications with the UE; transmitting a cancellation indication to the UE that indicates at least a first communication using the first resources is cancelled; and communicating with the UE using one or more alternative resources associated with a second configured grant, different from the first resources, based at least in part on the cancellation indication.

Aspect 16: The method of aspect 15, wherein the second configured grant is identified based at least in part on an RRC configuration of a search space that is associated with a DCI communication that carries the cancellation indication.

Aspect 17: The method of aspect 16, wherein the second configured grant is selected based at least in part on an ordered list of a plurality of configured grants.

Aspect 18: The method of any of aspects 15 through 17, further comprising: determining, based at least in part on the cancellation indication, whether to monitor for the first communication from the UE via the one or more alternative resources.

Aspect 19: The method of any of aspects 15 through 18, further comprising: transmitting, to the UE, configuration information for the first configured grant and the one or more alternative resources, and one or more criteria for determining whether to use the one or more alternative resources in response to a cancellation indication, and wherein the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

Aspect 20: The method of any of aspects 15 through 18, wherein the one or more criteria for determining whether to use the one or more alternative resources when the first communication is part of the dynamically scheduled grant include one or more of a hybrid automatic repeat request (HARQ) identifier associated with the first communication, a repetition number of the first communication, or an indication of whether a transport block size follows the first communication, or any combinations thereof.

Aspect 21: The method of any of aspects 15 through 20, wherein the one or more alternative resources are configured as one or more alternative resource parameters in the second configured grant, and the one or more alternative resource parameters include one or more of secondary time resources, secondary frequency resources, a secondary beam, or any combinations thereof, that are to be used in response to the cancellation indication.

Aspect 22: The method of any of aspects 15 through 21, wherein the determining further comprises: determining to use the one or more alternative resources for the first communication based at least in part on a length of a cancellation duration provided with the cancellation indication.

Aspect 23: An apparatus for wireless communications at a UE comprising a processor and memory coupled with the processor. The processor and memory configured to perform a method of any one of aspects 1 through 14.

Aspect 24: An apparatus for wireless communications at a UE, comprising at least one means for performing a method of any of aspects 1 through 14.

Aspect 25: A non-transitory computer-readable medium storing code for wireless communications at a UE, the code comprising instructions executable by a processor to perform a method of any of aspects 1 through 14.

Aspect 26: An apparatus for wireless communications at a base station, comprising a processor; memory coupled with the processor. The processor and memory configured to perform a method of any one of aspects 15 through 22.

Aspect 27: An apparatus for wireless communications at a base station, comprising at least one means for performing a method of any of aspects 15 through 22.

Aspect 28: A non-transitory computer-readable medium storing code for wireless communications at a base station, the code comprising instructions executable by a processor to perform a method of any of aspects 15 through 22.

Aspect 29: A method for wireless communication at a user equipment (UE), comprising: identifying periodic resources for communications with a base station as part of a configured grant; receiving, from the base station, a cancellation indication that indicates at least a first communication with the base station using the periodic resources is cancelled; and identifying one or more alternative resources, different from the identified periodic resources, based at least in part on the received cancellation indication.

Aspect 30: The method of aspect 29, further comprising determining, based at least in part on the received cancellation indication, whether to transmit the first communication via the one or more alternative resources.

Aspect 31: The method of any of aspects 29 through 30, wherein the identifying further comprises receiving, from the base station, configuration information for the configured grant and the one or more alternative resources, and one or more criteria for determining whether to use the one or more alternative resources.

Aspect 32: The method of aspect 31, wherein the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

Aspect 33: The method of any of aspects 29 through 32, wherein the configured grant is a first configured grant of a plurality of configured grants that are received from the base station, and wherein the one or more alternative resources are associated with a second configured grant of the plurality of configured grants that is different than the first configured grant.

Aspect 34: The method of aspect 33, wherein the second configured grant is identified based at least in part on a radio resource control (RRC) configuration of a search space that is associated with a downlink control information (DCI) communication that carries the cancellation indication.

Aspect 35: The method of any of aspects 33 through 34, wherein the second configured grant is selected based at least in part on an ordered list of the plurality of configured grants.

Aspect 36: The method of any of aspects 29 through 35, wherein the one or more alternative resources are indicated as one or more alternative resource parameters in the configured grant that provides the periodic resources for the first communication.

Aspect 37: The method of aspect 36, wherein the one or more alternative resource parameters include one or more of secondary time resources, secondary frequency resources, a secondary beam, or any combinations thereof, that are to be used in response to the cancellation indication.

Aspect 38: The method of any of aspects 29 through 37, further comprising determining to use the one or more alternative resources for transmission of the first communication based at least in part on a length of a cancellation duration provided with the cancellation indication.

Aspect 39: The method of aspect 38, further comprising determining a time duration for using the alternative resources based at least in part on a timing of the cancellation indication relative to at least the first communication, the length of the cancellation duration, a configured time duration, or any combinations thereof.

Aspect 40: The method of any of aspects 38 through 39, wherein the one or more alternative resources are used to transmit the first communication when the length of the cancellation duration meets or exceeds a time threshold, and wherein the UE cancels the first communication when the length of the cancellation duration is less than the time threshold.

Aspect 41: The method of any of aspects 29 through 40, wherein the alternative resources are determined based at least in part on a frequency portion identifier provided in the cancellation indication.

Aspect 42: The method of aspect 41, wherein the frequency portion identifier indicates whether frequency resources spanning all or a portion of a bandwidth part (BWP) are cancelled.

Aspect 43: An apparatus for wireless communications at a UE comprising at least one means for performing a method of any one of aspects 29 through 42.

Aspect 44: An apparatus for wireless communications at a UE comprising a processor and memory coupled with the processor. The processor and memory configured to perform a method of any one of aspects 29 through 42.

Aspect 45: A non-transitory computer-readable medium storing code for wireless communications at a base station, the code comprising instructions executable by a processor to perform a method of any of aspects 29 through 42.

Aspect 46: A method for wireless communications at a base station, comprising: configuring a user equipment (UE) with a configured grant that provides periodic resources for communications with the UE; determining to cancel at least a first communication with the UE using the periodic resources; transmitting a cancellation indication to the UE that indicates at least the first communication using the periodic resources is cancelled; and identifying one or more alternative resources, different from the identified periodic resources, based at least in part on the cancellation indication.

Aspect 47: The method of aspect 46, further comprising determining, based at least in part on the cancellation indication, whether to monitor for the first communication from the UE via the one or more alternative resources.

Aspect 48: The method of any of aspects 46 through 47, wherein the configuring further comprises transmitting, to the UE, configuration information for the configured grant and the one or more alternative resources, and one or more criteria for determining whether to use the one or more alternative resources in response to a cancellation indication.

Aspect 49: The method of aspect 48, wherein the one or more criteria for determining whether to use the one or more alternative resources include one or more of a timing of the cancellation indication relative to the first communication, a time duration associated with the cancellation indication, a set of resource blocks indicated by the cancellation indication, an amount cancelled resources associated with the cancellation indication, a preconfigured behavior associated with the cancellation indication, or any combinations thereof.

Aspect 50: The method of any of aspects 46 through 49, wherein the configured grant is a first configured grant of a plurality of configured grants that are configured at the UE, and wherein the one or more alternative resources are associated with a second configured grant of the plurality of configured grants that is different than the first configured grant.

Aspect 51: The method of aspect 50, wherein the second configured grant is identified based at least in part on a radio resource control (RRC) configuration of a search space that is associated with a downlink control information (DCI) communication that carries the cancellation indication.

Aspect 52: The method of any of aspects 50 through 51, wherein the second configured grant is selected based at least in part on an ordered list of the plurality of configured grants.

Aspect 53: The method of any of aspects 46 through 52, wherein the one or more alternative resources are configured as one or more alternative resource parameters in the configured grant that provides the periodic resources for the first communication.

Aspect 54: The method of aspect 53, wherein the one or more alternative resource parameters include one or more of secondary time resources, secondary frequency resources, a secondary beam, or any combinations thereof, that are to be used in response to the cancellation indication.

Aspect 55: The method of any of aspects 46 through 54, wherein the determining further comprises determining to use the one or more alternative resources for the first communication based at least in part on a length of a cancellation duration provided with the cancellation indication.

Aspect 56: The method of aspect 55, further comprising determining a time duration for using the alternative resources based at least in part on a timing of the cancellation indication relative to at least the first communication, the length of the cancellation duration, a configured time duration, or any combinations thereof.

Aspect 57: The method of any of aspects 55 through 56, wherein the one or more alternative resources for the first communication when the length of the cancellation duration meets or exceeds a time threshold, and wherein the UE cancels the first communication when the length of the cancellation duration is less than the time threshold.

Aspect 58: The method of any of aspects 46 through 57, wherein the alternative resources are determined based at least in part on a frequency portion identifier provided in the cancellation indication.

Aspect 59: The method of aspect 58, wherein the frequency portion identifier indicates whether frequency resources spanning all or a portion of a bandwidth part (BWP) are cancelled.

Aspect 60: An apparatus for wireless communications at a UE comprising at least one means for performing a method of any one of aspects 46 through 59.

Aspect 61: An apparatus for wireless communications at a UE comprising a processor and memory coupled with the processor. The processor and memory configured to perform a method of any one of aspects 46 through 59.

Aspect 62: A non-transitory computer-readable medium storing code for wireless communications at a base station, the code comprising instructions executable by a processor to perform a method of any of aspects 46 through 59.

Aspect 63: A method for wireless communication, comprising: communicating a configuration with one or more parameters for transmitting, on a configured grant, a corresponding data channel repetition corresponding to a dropped dynamically scheduled data channel repetition; determining to drop the dropped dynamically scheduled data channel repetition; and transmitting, based on determining to drop the dropped dynamically scheduled data channel repetition, the corresponding data channel repetition over resources of the configured grant and based on the one or more parameters.

Aspect 64: The method of aspect 63, wherein the one or more parameters include at least one of a hybrid automatic repeat/request (HARQ) identifier, a repetition number, or an indication of whether a transport block size follows the dropped dynamically scheduled data channel repetition.

Aspect 65: The method of any of aspects 63 or 64, wherein communicating the configuration includes receiving the configuration as part of a radio resource control (RRC) configuration for the configured grant.

Aspect 66: The method of aspect 65, wherein the one or more parameters include a hybrid automatic repeat/request (HARQ) offset to be added to a most recently used HARQ identifier for identifying the corresponding data channel repetition.

Aspect 67: The method of any of aspects 63 to 66, wherein communicating the configuration includes receiving the configuration in a scheduling downlink control information (DCI).

Aspect 68: The method of any of aspects 63 to 67, further comprising receiving a dynamic grant that activates resources for the configured grant, wherein at least one of a scheduling downlink control information (DCI) for the dynamic grant or a radio resource control (RRC) configuration for the configured grant includes one or more parameters indicating a relationship between the corresponding data channel repetition and the dropped dynamically scheduled data channel repetition.

Aspect 69: The method of any of aspects 63 to 68, wherein communicating the configuration includes transmitting uplink control information (UCI) for the configured grant, wherein the UCI includes an indication of a hybrid automatic repeat/request (HARQ) identifier of the corresponding data channel repetition.

Aspect 70: The method of any of aspects 63 to 69, wherein the one or more parameters include a new data indicator (NDI) received in a scheduling downlink control information (DCI) for the dropped dynamically scheduled data channel repetition, and further comprising determining, based on the NDI, an indication of whether a transport block size for the corresponding data channel repetition follows the dropped dynamically scheduled data channel repetition.

Aspect 71: The method of any of aspects 63 to 70, wherein the one or more parameters include a flag received in a scheduling downlink control information (DCI) for the dropped dynamically scheduled data channel repetition indicating whether at least one of a transport block size or a number of resource blocks used for the corresponding data channel repetition should follow parameters indicated in a dynamic grant for the configured grant or parameters in a radio resource control (RRC) configuration for the configured grant.

Aspect 72: The method of any of aspects 63 to 71, wherein transmitting the corresponding data channel repetition includes transmitting one or more repetitions of the corresponding data channel repetition on the resources of the configured grant based on a repetition parameter indicated in a radio resource control (RRC) configuration for the configured grant.

Aspect 73: The method of aspect 72, wherein transmitting the corresponding data channel repetition includes transmitting a number of repetitions of the corresponding data channel repetition that is less than or equal to a value of the repetition parameter.

Aspect 74: The method of any of aspects 63 to 73, wherein transmitting the corresponding data channel repetition includes transmitting one or more repetitions of the corresponding data channel repetition on the resources of the configured grant regardless of a repetition parameter indicated in a radio resource control (RRC) configuration for the configured grant.

Aspect 75: The method of any of aspects 63 to 74, wherein communicating the configuration or transmitting the corresponding data channel repetition over the resources of the configured grant is based on a frequency range configured for the dropped dynamically scheduled data channel repetition.

Aspect 76: A method for wireless communication, comprising: communicating a configuration with one or more parameters for transmitting, on a configured grant, a corresponding data channel repetition corresponding to a dropped dynamically scheduled data channel repetition that is dropped; and receiving the corresponding data channel repetition over resources of the configured grant and based on the one or more parameters.

Aspect 77: The method of aspect 76, wherein the one or more parameters include at least one of a hybrid automatic repeat/request (HARQ) identifier, a repetition number, or an indication of whether a transport block size follows the dropped dynamically scheduled data channel repetition, for the data channel repetition.

Aspect 78: The method of any of aspects 76 or 77, wherein communicating the configuration includes transmitting the configuration as part of a radio resource control (RRC) configuration for the configured grant.

Aspect 79: The method of aspect 78, wherein the one or more parameters include a hybrid automatic repeat/request (HARQ) offset to be added to a most recently used HARQ identifier for identifying the corresponding data channel repetition.

Aspect 80: The method of any of aspects 76 to 79, wherein communicating the configuration includes transmitting the configuration in a scheduling downlink control information (DCI).

Aspect 81: The method of any of aspects 76 to 80, further comprising transmitting a dynamic grant that activates resources for the configured grant, wherein at least one of a scheduling downlink control information (DCI) for the dynamic grant or a radio resource control (RRC) configuration for the configured grant includes one or more parameters indicating a relationship between the corresponding data channel repetition and the dropped dynamically scheduled data channel repetition that is dropped.

Aspect 82: The method of any of aspects 76 to 81, wherein communicating the configuration includes receiving uplink control information (UCI) for the configured grant, wherein the UCI includes an indication of a hybrid automatic repeat/request (HARQ) identifier of the corresponding data channel repetition.

Aspect 83: The method of any of aspects 76 to 82, wherein the one or more parameters include a new data indicator (NDI) received in a scheduling downlink control information (DCI) for the dropped dynamically scheduled data channel repetition.

Aspect 84: The method of any of aspects 76 to 83, wherein the one or more parameters include a flag received in a scheduling downlink control information (DCI) for the dropped dynamically scheduled data channel repetition indicating whether at least one of a transport block size or a number of resource blocks used for the corresponding data channel repetition should follow parameters indicated in a dynamic grant for the configured grant or parameters in a radio resource control (RRC) configuration for the configured grant.

85: The method of any of aspects 76 to 84, wherein receiving the corresponding data channel repetition includes receiving one or more repetitions of the corresponding data channel repetition on the resources of the configured grant based on a repetition parameter indicated in a radio resource control (RRC) configuration for the configured grant.

Aspect 86: The method of aspect 85, wherein receiving the corresponding data channel repetition includes receiving a number of repetitions of the corresponding data channel repetition that is less than or equal to a value of the repetition parameter.

Aspect 87: The method of any of aspects 76 to 86, wherein receiving the corresponding data channel repetition includes receiving one or more repetitions of the corresponding data channel repetition on the resources of the configured grant regardless of a repetition parameter indicated in a radio resource control (RRC) configuration for the configured grant.

Aspect 88: The method of any of aspects 76 to 87, wherein communicating the configuration or receiving the corresponding data channel repetition over the resources of the configured grant is based on a frequency range configured for the dropped dynamically scheduled data channel repetition.

Aspect 89: The method of any of aspects 76 to 88, further comprising decoding the data channel based at least in part on the corresponding data channel repetition.

Aspect 90: An apparatus for wireless communications at a UE comprising a processor and memory coupled with the processor. The processor and memory configured to perform a method of any one of aspects 63 to 89.

Aspect 91: An apparatus for wireless communication, comprising means for performing one or more of the methods of any of aspects 63 to 89.

Aspect 92: A computer-readable medium, comprising code executable by one or more processors for wireless communications, the code comprising code for performing one or more of the methods of any of aspects 63 to 81.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more memories; and
   one or more processors coupled with the one or more memories and configured to cause the UE to:
   receive a cancellation indication that indicates at least a first communication with an access network entity is cancelled, wherein the first communication uses first resources for communications with the access network entity as part of a first configured grant or as part of a dynamically scheduled grant; and
   communicate with the access network entity with one or more alternative resources associated with a second configured grant, different from the first resources, the one or more alternative resources based at least in part on a length of a cancellation duration provided with the cancellation indication, wherein the one or more alternative resources are used to transmit the first communication when the length of the cancellation duration satisfies a time threshold, and wherein the first communication is cancelled when the length of the cancellation duration fails to satisfy the time threshold.

2. The apparatus of claim 1, wherein the first configured grant is one of a plurality of configured grants that are received from the access network entity, and wherein the one or more alternative resources are associated with the second configured grant of the plurality of configured grants that is different from the first configured grant.

3. The apparatus of claim 2, wherein the second configured grant is identified based at least in part on a radio resource control (RRC) configuration of a search space that is associated with a downlink control information (DCI) communication that carries the cancellation indication.

4. The apparatus of claim 2, wherein the second configured grant is selected based at least in part on an ordered list of the plurality of configured grants.

5. The apparatus of claim 1, wherein the one or more processors are configured to cause the UE to:
   determine, based at least in part on the received cancellation indication, whether to transmit the first communication via the one or more alternative resources.

6. The apparatus of claim 1, wherein the one or more processors are configured to cause the UE to:
   receive, from the access network entity, configuration information for at least the second configured grant, and one or more criteria to determine whether to use the one or more alternative resources associated with the second configured grant.

7. The apparatus of claim 6, wherein the one or more criteria to determine whether to use the one or more alternative resources when the first communication is part of the first configured grant include one or more of a timing of the cancellation indication relative to the first communication, a time duration associated with the cancellation indication, a set of resource blocks indicated by the cancellation indication, an amount of cancelled resources associated with the cancellation indication, a configured behavior associated with the cancellation indication, or any combinations thereof.

8. The apparatus of claim 6, wherein the one or more criteria to determine whether to use the one or more alternative resources when the first communication is part of the dynamically scheduled grant include one or more of a hybrid automatic repeat request (HARD) identifier associated with the first communication, a repetition number of the first communication, or an indication of whether a transport block size follows the first communication, or any combinations thereof.

9. The apparatus of claim 1, wherein the one or more alternative resources are indicated as one or more alternative resource parameters in the first configured grant that provides the first resources for the first communication when the first communication is part of the first configured grant.

10. The apparatus of claim 1, wherein the one or more processors are configured to cause the UE to:
determine a time duration for using the one or more alternative resources based at least in part on a timing of the cancellation indication relative to at least the first communication, the length of the cancellation duration, a configured time duration, or any combinations thereof.

11. The apparatus of claim 1, wherein the one or more alternative resources are determined based at least in part on a frequency portion identifier provided in the cancellation indication.

12. The apparatus of claim 11, wherein the frequency portion identifier indicates whether frequency resources spanning all or a portion of a bandwidth part (BWP) are cancelled.

13. The apparatus of claim 1, wherein the first communication uses the first resources for communications with the access network entity as part of the first configured grant.

14. The apparatus of claim 1, wherein the first communication uses the first resources for communications with the access network entity as part of the dynamically scheduled grant.

15. An apparatus for wireless communications at an access network entity, comprising:
one or more memories; and
one or more processors coupled with the one or more memories and configured to cause the access network entity to:
output at least one of a first configured grant that provides first resources for communications with a user equipment (UE) or a dynamically scheduled grant that provides the first resources for communications with the UE;
output a cancellation indication that indicates at least a first communication using the first resources is cancelled; and
communicate with the UE using one or more alternative resources associated with a second configured grant, different from the first resources, the one or more alternative resources based at least in part on a length of a cancellation duration provided with the cancellation indication, wherein the one or more alternative resources are used for the first communication when the length of the cancellation duration satisfies a time threshold, and wherein the first communication is cancelled when the length of the cancellation duration fails to satisfy the time threshold.

16. The apparatus of claim 15, wherein the second configured grant is identified based at least in part on a radio resource control (RRC) configuration of a search space that is associated with a downlink control information (DCI) communication that carries the cancellation indication.

17. The apparatus of claim 16, wherein the second configured grant is selected based at least in part on an ordered list of a plurality of configured grants.

18. The apparatus of claim 15, wherein the one or more processors are configured to cause the access network entity to:
determine, based at least in part on the cancellation indication, whether to monitor for the first communication from the UE via the one or more alternative resources.

19. The apparatus of claim 15, wherein the one or more processors are configured to cause the access network entity to:
output configuration information for the first configured grant and the one or more alternative resources, and one or more criteria to determine whether to use the one or more alternative resources in response to the cancellation indication, and
wherein the one or more criteria to determine whether to use the one or more alternative resources include one or more of a timing of the cancellation indication relative to the first communication, a time duration associated with the cancellation indication, a set of resource blocks indicated by the cancellation indication, an amount of cancelled resources associated with the cancellation indication, a configured behavior associated with the cancellation indication, or any combinations thereof.

20. The apparatus of claim 15, wherein one or more criteria to determine whether to use the one or more alternative resources when the first communication is part of the dynamically scheduled grant include one or more of a hybrid automatic repeat request (HARQ) identifier associated with the first communication, a repetition number of the first communication, or an indication of whether a transport block size follows the first communication, or any combinations thereof.

21. The apparatus of claim 15, wherein the one or more alternative resources are configured as one or more alternative resource parameters in the second configured grant, and wherein the one or more alternative resource parameters include one or more of secondary time resources, secondary frequency resources, a secondary beam, or any combinations thereof, that are to be used in response to the cancellation indication.

22. The apparatus of claim 15, wherein, to output the one or more of the first configured grant or the dynamically scheduled grant, the one or more processors are configured to cause the access network entity to:
output the first configured grant that provides the first resources for communications with the UE.

23. The apparatus of claim 15, wherein, to output the one or more of the first configured grant or the dynamically scheduled grant, the one or more processors are configured to cause the access network entity to:
output the dynamically scheduled grant that provides the first resources for communications with the UE.

24. The apparatus of claim 15, wherein the first configured grant is one of a plurality of configured grants that are configured at the UE, and wherein the one or more alternative resources are associated with the second configured grant of the plurality of configured grants that is different than the first configured grant.

25. A method for wireless communications at a user equipment (UE), comprising:
receiving a cancellation indication that indicates at least a first communication with an access network entity is cancelled, wherein the first communication uses first resources for communications with the access network entity as part of a first configured grant or as part of a dynamically scheduled grant; and
communicating with the access network entity using one or more alternative resources associated with a second configured grant, different from the first resources, the one or more alternative resources based at least in part on a length of a cancellation duration provided with the cancellation indication, wherein the one or more alternative resources are used to transmit the first communication when the length of the cancellation duration satisfies a time threshold, and wherein the first communication is cancelled when the length of the cancellation duration fails to satisfy the time threshold.

26. The method of claim 25, wherein the first configured grant is one of a plurality of configured grants that are received from the access network entity, and wherein the one or more alternative resources are associated with the second configured grant of the plurality of configured grants that is different than the first configured grant.

27. The method of claim 26, wherein the second configured grant is identified based at least in part on a radio resource control (RRC) configuration of a search space that is associated with a downlink control information (DCI) communication that carries the cancellation indication.

28. The method of claim 26, wherein the second configured grant is selected based at least in part on an ordered list of the plurality of configured grants.

29. The method of claim 25, wherein the first communication uses the first resources for communications with the access network entity as part of the first configured grant.

30. The method of claim 25, wherein the first communication uses the first resources for communications with the access network entity as part of the dynamically scheduled grant.

31. A method for wireless communications at an access network entity, comprising:
outputting at least one of a first configured grant that provides first resources for communications with a user equipment (UE) or a dynamically scheduled grant that provides the first resources for communications with the UE;
outputting a cancellation indication that indicates at least a first communication using the first resources is cancelled; and
communicating with the UE using one or more alternative resources associated with a second configured grant, different from the first resources, the one or more alternative resources based at least in part on a length of a cancellation duration provided with the cancellation indication, wherein the one or more alternative resources are used for the first communication when the length of the cancellation duration satisfies a time threshold, and wherein the first communication is cancelled when the length of the cancellation duration fails to satisfy the time threshold.

32. The method of claim 31, wherein the first configured grant is one of a plurality of configured grants that are configured at the UE, and wherein the one or more alternative resources are associated with the second configured grant of the plurality of configured grants that is different than the first configured grant.

33. The method of claim 32, wherein the second configured grant is identified based at least in part on a radio resource control (RRC) configuration of a search space that is associated with a downlink control information (DCI) communication that carries the cancellation indication.

34. The method of claim 32, wherein the second configured grant is selected based at least in part on an ordered list of the plurality of configured grants.

35. The method of claim 31, the outputting the one or more of the first configured grant or the dynamically scheduled grant comprising:
outputting the first configured grant that provides the first resources for communications with the UE.

36. The method of claim 31, the outputting the one or more of the first configured grant or the dynamically scheduled grant comprising:
outputting the dynamically scheduled grant that provides the first resources for communications with the UE.

37. A non-transitory computer-readable medium storing code for wireless communication at a user equipment (UE), the code comprising instructions executable by one or more processors to cause the UE to:
receive a cancellation indication that indicates at least a first communication with an access network entity is cancelled, wherein the first communication uses first resources for communications with the access network entity as part of a first configured grant or as part of a dynamically scheduled grant; and
communicate with the access network entity using one or more alternative resources associated with a second configured grant, different from the first resources, the one or more alternative resources based at least in part on a length of a cancellation duration provided with the cancellation indication, wherein the one or more alternative resources are used to transmit the first communication when the length of the cancellation duration satisfies a time threshold, and wherein the first communication is cancelled when the length of the cancellation duration fails to satisfy the time threshold.

38. The non-transitory computer-readable medium of claim 37, wherein the first configured grant is one of a plurality of configured grants that are received from the access network entity, and wherein the one or more alternative resources are associated with the second configured grant of the plurality of configured grants that is different than the first configured grant.

39. The non-transitory computer-readable medium of claim 38, wherein the instructions are further executable by the one or more processors to cause the UE to:
determine, based at least in part on the received cancellation indication, whether to transmit the first communication via the one or more alternative resources.

40. The non-transitory computer-readable medium of claim 37, wherein the first communication uses the first resources for communications with the access network entity as part of the first configured grant.

41. The non-transitory computer-readable medium of claim 37, wherein the first communication uses the first resources for communications with the access network entity as part of the dynamically scheduled grant.

42. The non-transitory computer-readable medium of claim 37, wherein the second configured grant is identified based at least in part on a radio resource control (RRC) configuration of a search space that is associated with a downlink control information (DCI) communication that carries the cancellation indication.

43. A non-transitory computer-readable medium storing code for wireless communication at an access network entity, the code comprising instructions executable by one or more processors to cause the access network entity to:
output at least one of a first configured grant that provides first resources for communications with a user equipment (UE) or a dynamically scheduled grant that provides the first resources for communications with the UE;
output a cancellation indication that indicates at least a first communication using the first resources is cancelled; and
communicate with the UE using one or more alternative resources associated with a second configured grant, different from the first resources, the one or more alternative resources based at least in part on a length of a cancellation duration provided with the cancellation indication, wherein the one or more alternative resources are used for the first communication when the length of the cancellation duration satisfies a time threshold, and wherein the first communication is cancelled when the length of the cancellation duration fails to satisfy the time threshold.

44. The non-transitory computer-readable medium of claim 43, wherein the instructions are further executable by the one or more processors to cause the access network entity to:
determine, based at least in part on the cancellation indication, whether to monitor for the first communication from the UE via the one or more alternative resources.

45. The non-transitory computer-readable medium of claim 43, wherein the instructions are further executable by the one or more processors to cause the access network entity to:
output configuration information for the first configured grant and the one or more alternative resources, and one or more criteria for determining whether to use the one or more alternative resources in response to the cancellation indication, and
wherein the one or more criteria for determining whether to use the one or more alternative resources include one or more of a timing of the cancellation indication relative to the first communication, a time duration associated with the cancellation indication, a set of resource blocks indicated by the cancellation indication, an amount of cancelled resources associated with the cancellation indication, a preconfigured behavior associated with the cancellation indication, or any combinations thereof.

46. The non-transitory computer-readable medium of claim 43, wherein the instructions to output the one or more of the first configured grant or the dynamically scheduled grant are executable by the one or more processors to cause the access network entity to:
output the first configured grant that provides the first resources for communications with the UE.

47. The non-transitory computer-readable medium of claim 35, wherein the instructions to output the one or more of the first configured grant or the dynamically scheduled grant are executable by the one or more processors to cause the access network entity to:
output the dynamically scheduled grant that provides the first resources for communications with the UE.

48. The non-transitory computer-readable medium of claim 43, wherein the first configured grant is one of a plurality of configured grants that are configured at the UE, and wherein the one or more alternative resources are associated with the second configured grant of the plurality of configured grants that is different than the first configured grant.

49. The non-transitory computer-readable medium of claim 43, wherein the second configured grant is identified based at least in part on a radio resource control (RRC) configuration of a search space that is associated with a downlink control information (DCI) communication that carries the cancellation indication.

* * * * *